United States Patent
Park et al.

(10) Patent No.: US 11,337,186 B2
(45) Date of Patent: May 17, 2022

(54) METHOD AND APPARATUS FOR CONTROL INFORMATION SEARCHING AND DATA INFORMATION TRANSMISSION IN A COMMUNICATION SYSTEM

(71) Applicant: Samsung Electronics Co., Ltd., Gyeonggi-do (KR)

(72) Inventors: Sung-Jin Park, Incheon (KR); Jeong-Ho Yeo, Gyeonggi-do (KR); Jin-Young Oh, Seoul (KR); Ju-Ho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/971,141

(22) Filed: May 4, 2018

(65) Prior Publication Data
US 2018/0324789 A1    Nov. 8, 2018

(30) Foreign Application Priority Data

May 4, 2017    (KR) .................. 10-2017-0056983

(51) Int. Cl.
*H04W 72/04*        (2009.01)
*H04W 72/08*        (2009.01)
(Continued)

(52) U.S. Cl.
CPC ....... *H04W 72/0413* (2013.01); *H04L 5/0044* (2013.01); *H04L 5/0053* (2013.01);
(Continued)

(58) Field of Classification Search
CPC ... H04L 5/0094; H04L 5/0055; H04L 1/1861; H04L 5/00; H04L 5/0007; H04L 5/0044;
(Continued)

(56) References Cited

U.S. PATENT DOCUMENTS

2016/0013910 A1*    1/2016    Ji ..................... H04L 5/0053
                                                              370/329
2016/0360513 A1*    12/2016    Kim ................. H04L 5/001
(Continued)

FOREIGN PATENT DOCUMENTS

WO    WO 2016/111599    7/2016

OTHER PUBLICATIONS

Ericsson, "On Data Transmission on Control Resource Set", R1-1706033, 3GPP TSG-RAN WG1 Meeting#88bis, Apr. 3-7, 2017, 6 pages.

(Continued)

*Primary Examiner* — Yemane Mesfin
*Assistant Examiner* — Mon Cheri S Davenport
(74) *Attorney, Agent, or Firm* — The Farrell Law Firm, P.C.

(57) ABSTRACT

A method is provided for when an allocation area of data indicated by control information overlaps a subsequent control information area occurring after a control information area is pre-configured by a higher layer signal or system information. A terminal may omit or partially perform a blind search for the subsequent control information area overlapping a data area. Additionally, a terminal may receive data based on an assumption that a data area has been mapped to the subsequent control information area, or a terminal may receive data based on an assumption that a data area has not been mapped to the subsequent control information area. Thus, the terminal may adaptively adjust a configuration area for a data area and prevent blind decoding to further reduce power consumption.

20 Claims, 17 Drawing Sheets

(51) Int. Cl.
H04L 5/00 (2006.01)
*H04W 72/14* (2009.01)

(52) U.S. Cl.
CPC ....... H04W 72/048 (2013.01); H04W 72/087 (2013.01); *H04L 5/0007* (2013.01); *H04L 5/0016* (2013.01); *H04W 72/042* (2013.01); *H04W 72/0453* (2013.01); *H04W 72/14* (2013.01)

(58) Field of Classification Search
CPC . H04L 5/0053; H04L 5/14; H04L 1/00; H04L 1/1671; H04L 1/1812; H04L 1/1854; H04L 27/2613; H04L 5/0016; H04L 5/0023; H04L 5/0035; H04L 5/0037; H04L 5/0073; H04L 5/0078; H04L 5/0082; H04L 5/0091; H04L 5/1469; H04W 72/042; H04W 72/0446; H04W 72/0413; H04W 56/0005; H04W 72/0453; H04W 72/14; H04W 88/06; H04B 7/0413; H04B 7/0626; H04J 13/12; H04J 1/02; H04J 2013/0096
See application file for complete search history.

(56) References Cited

U.S. PATENT DOCUMENTS

| 2016/0366670 | A1  | 12/2016 | Feng et al. |            |
|--------------|-----|---------|-------------|------------|
| 2018/0049164 | A1* | 2/2018  | Wu          | H04W 72/12 |
| 2020/0178233 | A1* | 6/2020  | Li          | H04W 72/1273 |
| 2020/0221482 | A1* | 7/2020  | Xu          | H04W 72/0453 |

OTHER PUBLICATIONS

InterDigital Communications, "Control Channels in NR", R1-1705442, 3GPP TSG RAN WG1 Meeting #88bis, Apr. 3-7, 2017, 3 pages.
International Search Report dated Jul. 30, 2018 issued in counterpart application No. PCT/KR2018/005212, 10 pages.

\* cited by examiner

METHOD AND APPARATUS FOR CONTROL INFORMATION SEARCHING AND DATA INFORMATION TRANSMISSION IN A COMMUNICATION SYSTEM

CROSS-REFERENCE TO RELATED APPLICATION(S)

This application is based on and claims priority under 35 U.S.C. § 119 to Korean Patent Application No. 10-2017-0056983, filed on May 4, 2017, in the Korean Intellectual Property Office, the disclosure of which is hereby incorporated by reference in its entirety.

BACKGROUND

1. Field

The present disclosure relates to a wireless communication system and, more specifically, to a method and apparatus for smoothly providing a service in a communication system, and for data information transmission and control in a communication system.

2. Description of the Related Art

In order to meet wireless data traffic demands that have been increasing after commercialization of 4th-Generation (4G) communication systems, efforts to develop an improved 5th-Generation (5G) communication system or a pre-5G communication system have been made. For this reason, the 5G communication system, or pre-5G communication system, is called a beyond 4G network communication system or a post long-term evolution LTE system.

In order to achieve a high data transmission rate, an implementation of the 5G communication system in an ultra-high frequency (mmWave) band (i.e., 60 GHz band) is being considered. In the 5G communication system, technologies such as beamforming, massive multiple-input multiple-output (MIMO), full dimensional MIMO (FD-MIMO), an array antenna, analog beam-forming, and a large scale antenna are considered to mitigate a propagation path loss and increase a propagation transmission distance of electric waves in the ultra-high frequency band.

Further, technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as hybrid frequency-shift keying (FSK) and quadrature amplitude modulation (QAM), frequency QAM (FQAM), sliding window superposition coding (SWSC), and advanced access technologies, such as filter bank multi carrier (FBMC), non-orthogonal multiple access (NOMA), and sparse code multiple access (SCMA).

Meanwhile, the Internet is evolving from a human-oriented connection network in which humans generate and consume information, to the Internet of things (IoT) network in which distributed elements, such as things, exchange and process information. Also, the Internet of everything (IoE) technology in which Big Data processing technology, through a connection with a cloud server, is combined with the IoT technology has emerged. In order to implement the IoT, technical factors such as a sensing technique, wired/wireless communication, network infrastructure, service interface technology, and security technology are required, and thus technologies such as a sensor network, machine-to-machine (M2M) communication and machine-type communication (MTC), for a connection between IoT devices has recently been researched.

In an IoT environment, through collection and analysis of data generated in connected objects, an intelligent Internet technology service to create a new value for peoples' lives may be provided. The IoT may be applied to smart homes, smart buildings, smart cities, smart cars, connected cars, smart grids, health care, smart home appliances, or high-tech medical services, through the convergence of the conventional information technology (IT) with various industries.

Accordingly, various attempts to apply a 5G communication system to an IoT network are being made. For example, technologies such as a sensor network, M2M communication, and MTC are implemented by 5G communication techniques, such as beamforming, MIMO, and array antenna schemes. The application of a cloud RAN as the big data processing technology, described above, may be an example of converging the 5G technology and the IoT technology.

A plurality of services can be provided to a user in a communication system. Accordingly, a method and an apparatus can provide services within a same time interval in accordance with characteristics in order to provide a required plurality of services to the user.

When a service (a second type service) punctures and uses resources of another service (a first type service) that is scheduled in advanced, in a situation where different types of services can exist, the present disclosure proposes utilizing the punctured information by a terminal (or by a device).

Here, when the punctured portion is limited to a certain code block, the RVs applied to the entire code block may be different from each other. All or part of the punctured code block is not transmitted. Therefore, unlike a broken code block due to the channel, the RV rules can be changed.

SUMMARY

Embodiments of the present disclosure address at least the above-mentioned problems and/or disadvantages and provide at least the advantages described below.

In accordance with an aspect, a communication system provides a plurality of services to a user.

In accordance with another aspect, the present disclosure provides a method and an apparatus for efficiently transmitting or receiving control information and data in a communication system.

According to another aspect, the present disclosure provides a scheme for enabling a terminal to receive data information when a downlink data area scheduled in a downlink control area overlaps a subsequent downlink control area.

According to an embodiment, the present disclosure provides a method for searching for downlink control information in a communication system, including determining a downlink control area of a terminal through a higher layer signal or a physical signal by the terminal, and searching for control information through the downlink control area.

In accordance with an embodiment, a method for transmitting downlink control information in a communication system is provided, the method including receiving downlink control information by a terminal, determining a mapping scheme for data based on the downlink control information, and transmitting or receiving data information by using the mapping scheme.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
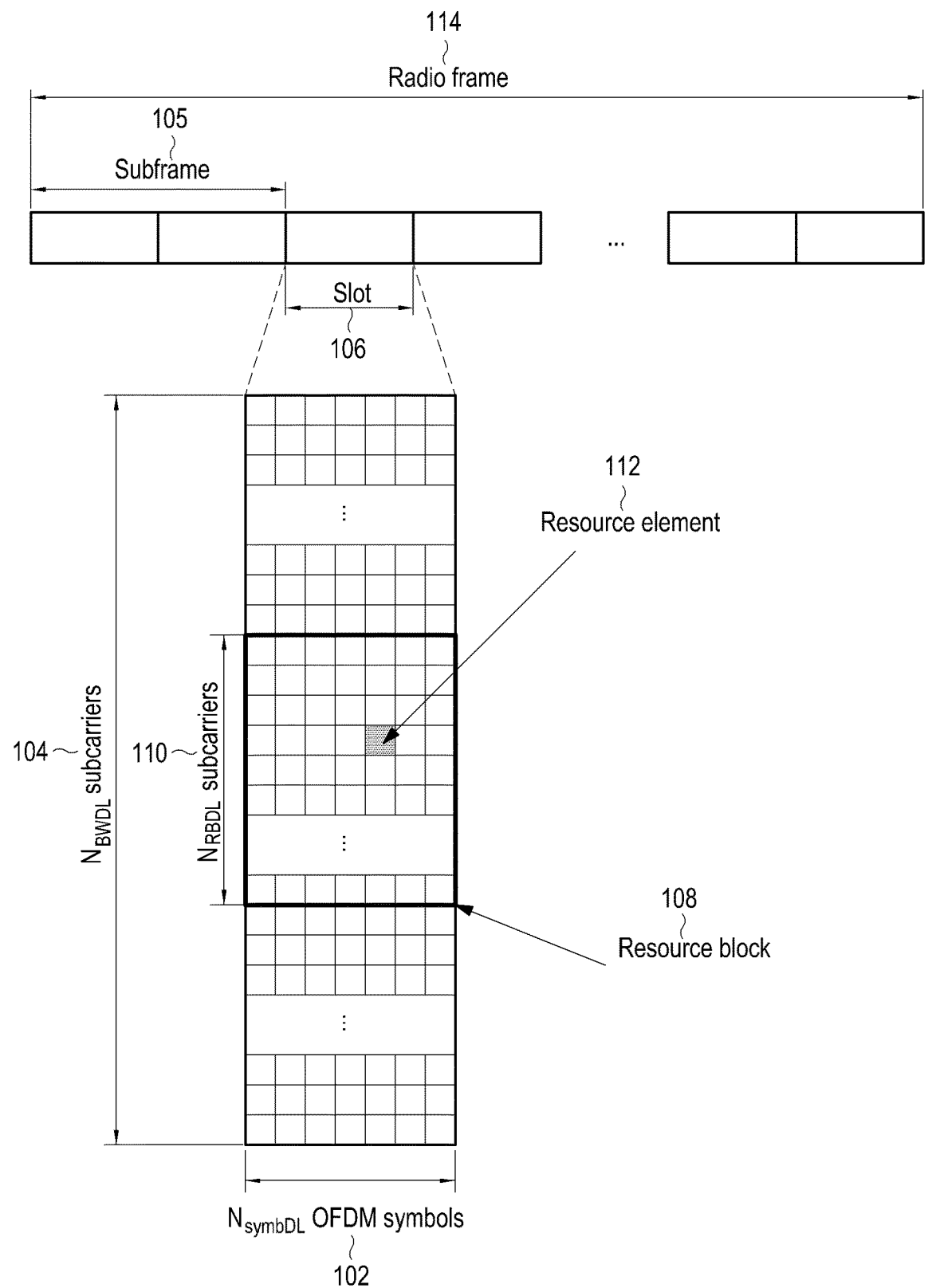
FIG. 1 illustrates a downlink time-frequency area transmission structure of an LTE or LTE-A system.

Embodiments of the present disclosure are described with reference to the accompanying drawings.

The present disclosure may omit descriptions of technologies that are known to those skilled in the art and are not directly related to the present disclosure.

In the accompanying drawings, some elements may be exaggerated, omitted, or schematically illustrated. Further, the size of each element does not necessarily reflect the actual size. In the drawings, identical or corresponding elements may be provided with identical reference numerals.

The present disclosure is not limited to the embodiments set forth below, but may be implemented in various forms.

Computer program instructions may implement each block, and combinations of blocks, in the flowchart illustrations.

The computer program instructions can be provided to a processor of a general purpose computer, special purpose computer, or other programmable data processing apparatus, such that the instructions, which execute via the processor of the computer or other programmable data processing apparatus, create a means for implementing the functions specified in the block or blocks of flowchart.

The computer program instructions may also be stored in a computer usable or computer-readable memory that may direct a computer or other programmable data processing apparatus to function in a particular manner, such that the instructions stored in the computer usable or computer-readable memory may produce an article of manufacture including an instruction means that implements the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions provide steps for implementing the functions specified in the flowchart block or blocks.

Further, each block of the flowchart illustrations may represent a module, segment, or portion of code, which includes one or more executable instructions for implementing the specified logical function or functions. In some alternative implementations, the functions noted in the blocks may occur out of order. For example, two blocks shown in succession may in fact be executed at or about the same time, or the blocks may sometimes be executed in reverse order, depending upon the functionality involved.

As used herein, the terms "unit" or "module" refer to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class or task elements, processes, functions, properties, procedures, sub-routines, segments of a program code, drivers, firmware, micro-codes, circuits, data, database, data structures, tables, arrays, and parameters.

Elements and functions provided by "units" may either be divided into a smaller number of elements and "units", or combined into a larger number of elements and "units". Moreover, the elements, "units", or "modules" may be implemented to reproduce one or more central processing units (CPUs) within a device or a security multimedia card. Further, a "unit" may include at least one processor.

A communication system can effectively transmit data by using different types of services, and provide a method that allows for the coexistence of data transmissions in different types of services, so as to satisfy requirements of the services. Thus, the communication system can reduce a delay in transmission time and enable efficient use of frequency-time resources or spatial resources.

A wireless communication system has been developed from an initial wireless communication system providing a voice-based service to a broadband wireless communication system providing a high speed and high quality packet data service, such as a high speed packet access (HSPA) of 3rd generation partnership project (3GPP), LTE, evolved-universal terrestrial radio access (E-UTRA), LTE-Advanced, high rate packet data (HRPD) of 3GPP2, ultra mobile broadband (UMB), and communication standards of the Institute of Electrical and Electronics Engineers (IEEE) 802.16e. Further, 5G or new radio (NR) communication standards are being made for a 5th generation wireless communication system.

In a 5th generation wireless communication system, at least one service of enhanced mobile broadband (eMBB), massive MTC, and ultra-reliable and low latency communications (URLLC) may be provided to a terminal or a user equipment (UE). The services enumerated above may be provided to an identical terminal during an identical time interval.

According to an embodiment, the eMBB may be a service targeted at high speed transmission of large capacity data, the mMTC may be a service targeted at minimizing terminal power and access of multiple terminals, and the URLLC may be a service targeted at high reliability and low delay. The above three services may be important services in an LTE system or in a system of 5G/NR. A method of eMBB coexisting with URLLC or mMTC coexisting with URLLC, and an apparatus using the same will be discussed.

When a base station has data scheduled to be transmitted to a terminal corresponding to an eMBB service in a particular transmission time interval (TTI), and is in a situation requiring transmission of URLLC data in the TTI, the base station may transmit the URLLC data, instead of a part of the eMBB data, in a frequency band through which the base station is already transmitting the eMBB data through the scheduling. A terminal having received the scheduled eMBB data and a UE having received the scheduled URLLC may either be the same terminal or different terminals.

In one case, since a part of the eMBB data being scheduled is not transmitted, the possibility that the eMBB data may be damaged increases. Therefore, it is necessary to determine a method for receiving a signal and processing the received signal by a terminal having already received the scheduled eMBB data or the scheduled URLLC.

Therefore, according to an embodiment, a method for different services coexisting to enable transmission of information according to each service when eMBB and URLLC information is scheduled through a partly or entirely shared frequency band, when mMTC and URLLC information is simultaneously scheduled, when mMTC and eMBB information is simultaneously scheduled, or when eMBB, mMTC, and URLLC information is simultaneously scheduled, is discussed.

In the following description, a base station is a subject for performing allocation of a resource for a terminal, and may be at least one of a gNode B, an eNode B, a Node B, a base station (BS), a wireless access unit, a base station controller, and a network node. A terminal may include a UE, a mobile station (MS), a cellular phone, a smart phone, a computer, or a multimedia system capable of performing a communication function. In the present disclosure, a downlink (DL) is a wireless transmission path through which a BS transmits a signal to a terminal, and an uplink (UL) is a wireless transmission path through which a terminal transmits a signal to a BS.

Further, embodiments of the present disclosure are discussed as an example of an LTE or LTE-A system. However, the embodiments of the present disclosure may be applied to other communication systems having similar technical backgrounds or channel types. For example, such other communication systems may include a system using 5G, NR, or other systems developed after LTE-A. Further, embodiments of the present disclosure may be applied to other communication systems through partial modification thereof within a range determined by those skilled in the art not to coincide with the scope of the present disclosure.

The LTE system, as a representative example of a broadband wireless communication system, employs an orthogonal frequency division multiplexing (OFDM) scheme for the downlink and a single carrier frequency division multiple access (SC-FDMA) scheme for the uplink. The uplink is a wireless link through which a terminal (or a UE or MS) transmits data or a control signal to a base station (or a gNode B), and the downlink is a wireless link through which a base station transmits data or a control signal to a terminal. In the multiple access schemes as described above, time-frequency resources for carrying data or control information may be allocated and operated in a manner to prevent overlapping of the resources (i.e., to establish the orthogonality, between users), so as to identify data or control information of each user.

The LTE system employs a hybrid automatic repeat request (HARQ) scheme in which, when decoding of initially-transmitted data fails, the data is retransmitted in a physical layer. In the HARQ scheme, when a receiver fails to accurately decode data, the receiver may transmit a negative acknowledgement (NACK) notifying of a decoding failure to a transmitter to enable the transmitter to retransmit the data in a physical layer. The receiver may combine the data retransmitted by the transmitter with the decoding-failed data to enhance the data reception capability. Further, when the receiver has accurately decoded data, the receiver may transmit an acknowledgement (ACK) notifying of a decoding success to a transmitter to enable the transmitter to transmit new data.

As discussed below, a higher layer signal, which is a signal, such as a signal indicator bit (SIB), a radio resource signal (RRC), a media access control (MAC), or a control element (CE), semi-statically or statically supports a particular operation control of a terminal, and a physical signal, which is a layer 1 (L1) signal, dynamically supports a particular operation control of a terminal in the form of terminal-common downlink control information or terminal-specific downlink control information.

FIG. 1 illustrates a basic structure of a time-frequency area, which is a wireless resource area for transmission of data or a control channel in a downlink of an LTE or similar system. As an example, a resource area may be referred to as a resource set.

In FIG. 1, the transverse axis indicates a time domain and the longitudinal axis indicates a frequency domain. The least transmission unit in the time domain is an OFDM symbol, and $N_{symbDL}$ number of OFDM symbols 102 may configure one slot 106. Further, two slots may configure one subframe 105. For example, the length of the slot may be 0.5 ms and the length of the subframe may be 1.0 ms. A radio frame 114 may be a time area interval configured by 10 subframes. Meanwhile, the least transmission unit in the frequency domain is a subcarrier, and the entire system transmission bandwidth may be configured by a total of NBWDL number of subcarriers 104. However, the present disclosure is not limited to the specific numerical values described above, and the numerical values described above may variably be applied.

A basic resource unit in the time-frequency domain is a resource element (RE) 112 and can be expressed by an OFDM symbol index and a subcarrier index. A resource block (RB) 108 or physical RB (PRB) may be defined by $N_{symbDL}$ number of consecutive OFDM symbols 102 in the time domain and NRBDL number of consecutive subcarriers 110 in the frequency domain. Therefore, in one slot, one RB 108 may include ($N_{symbDL} \times N_{RBDL}$) number of REs 112. The least unit for allocation of data in the frequency domain may be the RB. For example, in an LTE system, $N_{symbDL}$ may be 7 and $N_{RBDL}$ may be 12, and $N_{BWDL}$ and $N_{RBDL}$ may be proportional to the system transmission bandwidth. The data rate may increase in proportion to the number of RBs scheduled to a terminal. For example, an LTE system may define and operate six transmission bandwidths. In the case of a frequency division duplexing (FDD) system in which the downlink and the uplink are distinguished by frequency, the downlink transmission bandwidth and the uplink transmission bandwidth may be different from each other. The channel bandwidth may indicate an RF bandwidth corresponding to the system transmission bandwidth.

Table 1 below, shows a corresponding relationship between channel bandwidths and system transmission bandwidths defined in an LTE system. Referring to Table 1, an LTE system having a channel bandwidth of 10 MHz may have a transmission bandwidth configured by 50 RBs. However, the numerical values in Table 1, below, are merely an example and may be variously applied.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RBDL}$ | 6 | 15 | 25 | 50 | 75 | 100 |

Downlink control information may be transmitted within initial N number of OFDM symbols in the subframe, wherein N may be an integer value, such as 1, 2, or 3. Further, N may be variably applied to each subframe according to the quantity of control information to be transmitted to the subframe. The transmitted downlink control information may include at least one amongst a control channel transmission interval indicator indicating the number of OFDM symbols through which the control information is transmitted, scheduling information relating to downlink data or uplink data, and information relating to HARQ ACK/NACK.

In an LTE system, the scheduling information relating to downlink data or uplink data may be transferred from a base station to a terminal through downlink control information (DCI). The DCI is defined according to various formats and may provide information on whether the DCI includes scheduling information (UL grant) relating to uplink data or scheduling information (DL grant) relating to downlink data, whether it is compact DCI containing small-sized control information, whether spatial multiplexing using multiple antennas is applied thereto, and whether it is DCI for power control, according to each format.

For example, if DCI format is 1, which is scheduling control information (DL grant) relating to downlink data, then it may include at least one among: a resource allocation type 0/1 flag; a resource block allocation; modulation and coding scheme (MCS); a HARQ process number; a new data indicator; a redundancy version; and a transmission power control (TPC) command for a physical uplink control channel (PUCCH). The information enumerated above may be defined as follows.

A resource allocation type 0/1 flag indicates whether the resource allocation type is type 0 or type 1. Type 0 applies a bitmap scheme and allocates resources by resource block group (RBG) units. In an LTE system, a basic unit of scheduling is a RB expressed by time and frequency domain resources and an RBG is configured by a plurality of RBs and serves as a basic unit of scheduling in a type 0 scheme. Type 1 allows allocation of a particular RB in an RBG Resource block allocation indicates an RB allocated to data transmission. An expressed resource is determined according to the system bandwidth and resource allocation scheme.

Modulation and coding scheme indicates a modulation scheme used for data transmission and a size of a transport block (TB), which is data to be transmitted.

HARQ process number indicates a process number of an HARQ.

New data indicator indicates whether it is an HARQ initial transmission or retransmission.

Redundancy version indicates a redundancy version of HARQ.

Transmission power control command for PUCCH indicates an uplink control channel.

After being channel-coded and modulated, the DCI may be transmitted through a PDCCH (or downlink control information; hereinafter, both will be used interchangeably) or an enhanced PDCCH (EPDCCH) (or enhanced downlink control information; hereinafter, both will be used interchangeably).

The DCI may be scrambled using a particular radio network temporary identifier (RNTI) (or a terminal identifier) independently for each terminal, may include a cyclic redundancy check (CRC) added thereto, may be channel-coded, and then may be configured as an independent PDCCH, which may then be transmitted. In the time domain, a PDCCH may be mapped and transmitted during the control channel transmission interval. A frequency domain mapping position of a PDCCH may be determined by an identifier (ID) of each terminal, and the PDCCH may be transmitted throughout the entire system transmission bandwidth.

Downlink data may be transmitted through a physical downlink shared channel (PDSCH), which is a physical channel for downlink data transmission. The PDSCH may be transmitted from a time point after the control channel transmission interval, and scheduling information, such as a modulation scheme or a specific mapping position in a frequency area, may be determined on the basis of the DCI transmitted through the PDCCH.

Through MCS among control information configuring the DCI, a base station may notify a terminal of a modulation scheme applied to a PDSCH to be transmitted and a size (transport block size; TBS) of data to be transmitted. For example, the MCS may be configured by 5 bits, or a larger or smaller number of bits. The TBS may correspond to a size before channel coding for error correction is applied to a data TB which is to be transmitted by a BS.

Modulation schemes supported by an LTE system include quadrature phase shift keying (QPSK), 16 quadrature amplitude modulation (16 QAM), and 64 QAM, which may have modulation orders (Qm) of 2, 4, and 6, respectively. That is, the QPSK modulation allows transmission of 2 bits for each symbol, the 16 QAM modulation allows transmission of 4 bits for each symbol, and the 64 QAM modulation allows transmission of 6 bits for each symbol. Further, a modulation scheme of 256 QAM or higher may be used according to system modulation. However, the numerical values described above correspond to just an example and may be variously applied.

Figure 2:
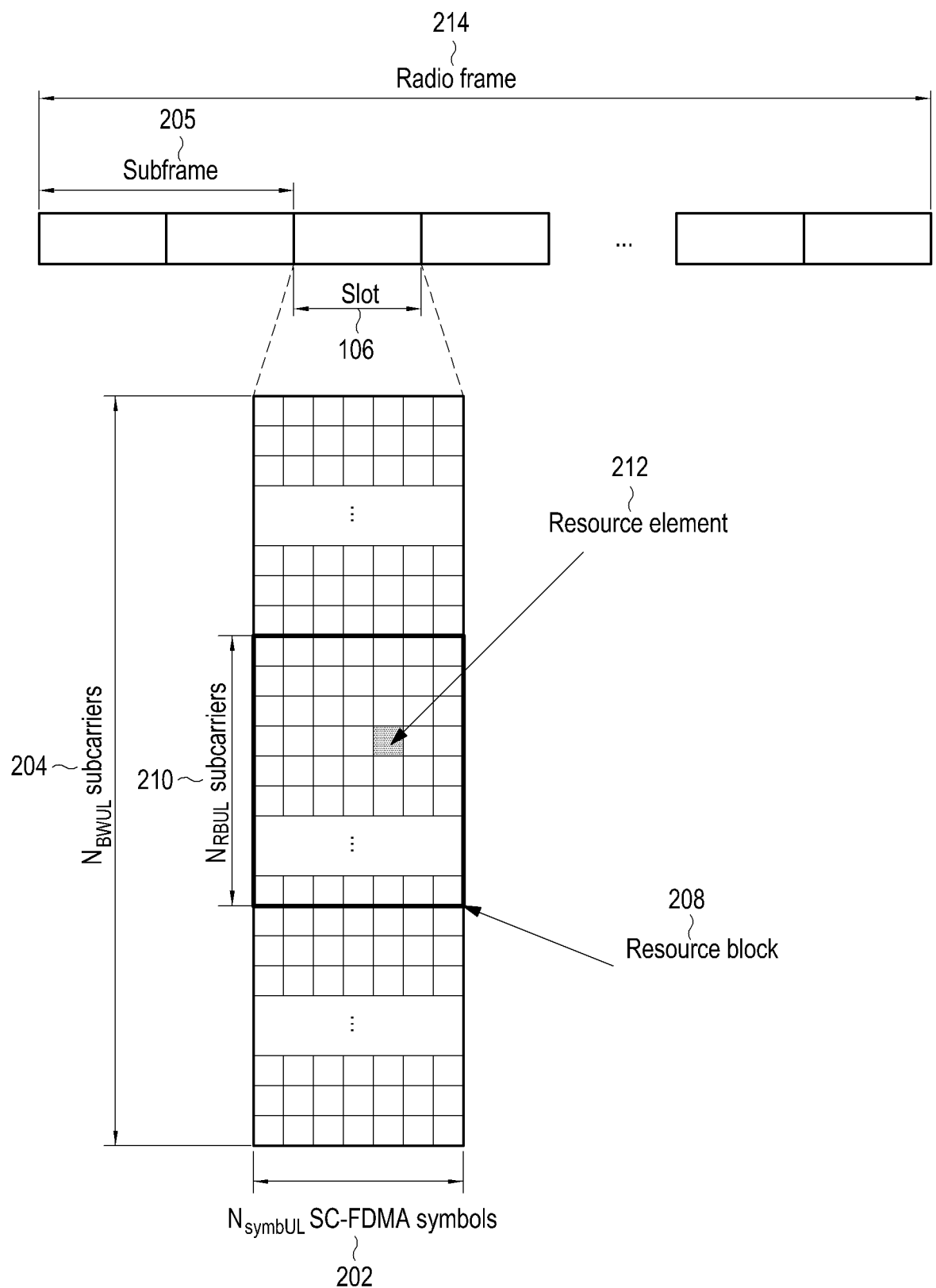
FIG. 2 illustrates an uplink time-frequency area transmission structure of an LTE or LTE-A system.

FIG. 2 illustrates a basic structure of a time-frequency area, which is a wireless resource area for transmission of data or a control channel in an UL in an LTE-A system. As an example, a resource area may be referred to as a resource set.

In FIG. 2, the transverse axis indicates a time domain and the longitudinal axis indicates a frequency domain. The least transmission unit in the time domain is an SC-FDMA symbol, and a $N_{symbUL}$ number of OFDM symbols 202 may configure one slot 206. Further, two slots may configure one subframe 205. Meanwhile, the least transmission unit in the frequency domain is a subcarrier, and the entire system transmission bandwidth may be configured by a total of $N_{BWUL}$ number of subcarriers 204. Herein, $N_{BWUL}$ may have a value proportional to the system transmission bandwidth.

A basic resource unit in the time-frequency domain is a resource element (RE) 212 and can be expressed by an SC-FDMA symbol index and a subcarrier index. A RB pair 208 may be defined by a $N_{symbUL}$ number of consecutive SC-FDMA symbols 202 in the time domain and a NRBUL number of consecutive subcarriers 210 in the frequency domain. Therefore, one RB 208 may include ($N_{symbUL} \times N_{RBUL}$) number of REs 212. A minimum transmission unit of data or control information may be an RB. A PUCCH may be mapped to a frequency area corresponding to one RB and may be then transmitted during one subframe.

In an LTE system, a timing relationship of a PUCCH or PUSCH, which is an uplink physical channel for transmission of an HARQ ACK/NACK corresponding to a PDCCH/EPDDCH including a semi-persistent scheduling (SPS) release, or a PDSCH which is a physical channel for downlink data transmission, may be defined. For example, in an LTE system operating using an FDD scheme, an HARQ ACK/NACK corresponding to a PDCCH/EPDCCH including an SPS release or a PDSCH transmitted in the (n−4)th subframe may be transmitted through a PUCCH or PUSCH in the nth subframe.

In an LTE system, a downlink HARQ may employ an asynchronous HARQ scheme in which a data retransmission time point is not fixed. That is, when an eNB has received an HARQ NACK fed back from a UE in response to data initially transmitted, the eNB can freely determine a next data retransmission time point through a scheduling operation. For the HARQ operation, the UE may buffer data, which has been determined as erroneous as a result of decoding of received data, and then combine the buffered data with the next retransmission data.

Upon receiving a PDSCH including downlink data transmitted from a BS in subframe n, a terminal may transmit uplink control information including an HARQ ACK or NACK of the downlink data to the base station through a PUCCH or PUSCH in subframe (n+k).

Hereinafter, k may be defined according to an FDD or a time division duplex (TDD) of the LTE system and a subframe configuration thereof. For example, in an FDD LTE system, k may be fixed to 4. In a TDD LTE system, k may change according to subframe configuration and subframe number. Further, k may have a value changing according to a TDD configuration of each carrier at the time of data transmission through a plurality of carriers.

In an LTE system, the uplink HARQ may employ a synchronous HARQ scheme in which a data retransmission time point is fixed, differently from the downlink HARQ. In other words, the uplink/downlink timing relation of a physical uplink shared channel (PUSCH), which is a physical channel for uplink data transmission, a PDCCH, which is a downlink control channel preceding the PUSCH, and a physical hybrid indicator channel (PHICH), which is a physical channel for transmission of a downlink HARQ ACK/NACK corresponding to the PUSCH, may follow the following transmission and reception rules.

When receiving a PHICH, for transmission of a downlink HARQ ACK/NACK or a PDCCH including uplink scheduling control information transmitted from an eNB in subframe n, a terminal may transmit uplink data corresponding to the control information in subframe (n+k) through a PUSCH. Hereinafter, k may be defined according to an FDD or a TDD of the LTE system and a configuration thereof. For example, in an FDD LTE system, k may be fixed to 4. In a TDD LTE system, k may change according to a subframe configuration and a subframe number. Further, k may have a value that changes according to a TDD configuration of each carrier at the time of data transmission through a plurality of carriers.

Further, when a terminal receives a PHICH including information associated with a downlink HARQ ACK/NACK from a base station in subframe i, the PHICH may correspond to a PUSCH transmitted in subframe (i-k) by the terminal. Hereinafter, k may be defined according to an FDD or a TDD of the LTE system and a configuration thereof. For example, in an FDD LTE system, k is fixed to 4. In a TDD LTE system, k may change according to a subframe configuration and a subframe number. Further, k may have a value changing according to a TDD configuration of each carrier at the time of data transmission through a plurality of carriers.

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI | Common and | Transmit diversity (see |

TABLE 2-continued

| Transmission mode | DCI format | Search Space | Transmission scheme of PDSCH corresponding to PDCCH |
|---|---|---|---|
| | format 1A | UE specific by C-RNTI | subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission; port 7 and 8 (see subclause 7.1.5A) or single-antenna port, port 7 or 8 (see subclause 7.1.1) |

Table 2 shows supportable DCI format types according to transmission modes in a condition configured by cell radio network temporary identifier (C-RNTI) defined in 3GPP TS 36.213. A terminal may assume the existence of a corresponding DCI format and perform searching and decoding in a control area interval according to a pre-configured transmission mode. For example, when a terminal has received an indication of transmission mode 8, the terminal searches for DCI format 1A in a common search space and a terminal-specific (UE-specific) search space, and can search for DCI format 2B only in the terminal-specific search space.

The above description of the wireless communication system is based on an LTE system. The present disclosure, however, is not limited to the LTE system but can be applied to various wireless communication systems, such as NR or 5G. Further, when the present disclosure is applied to another wireless communication system, the value of k may be variably applied to a system employing a modulation scheme corresponding to the FDD.

Figure 3:
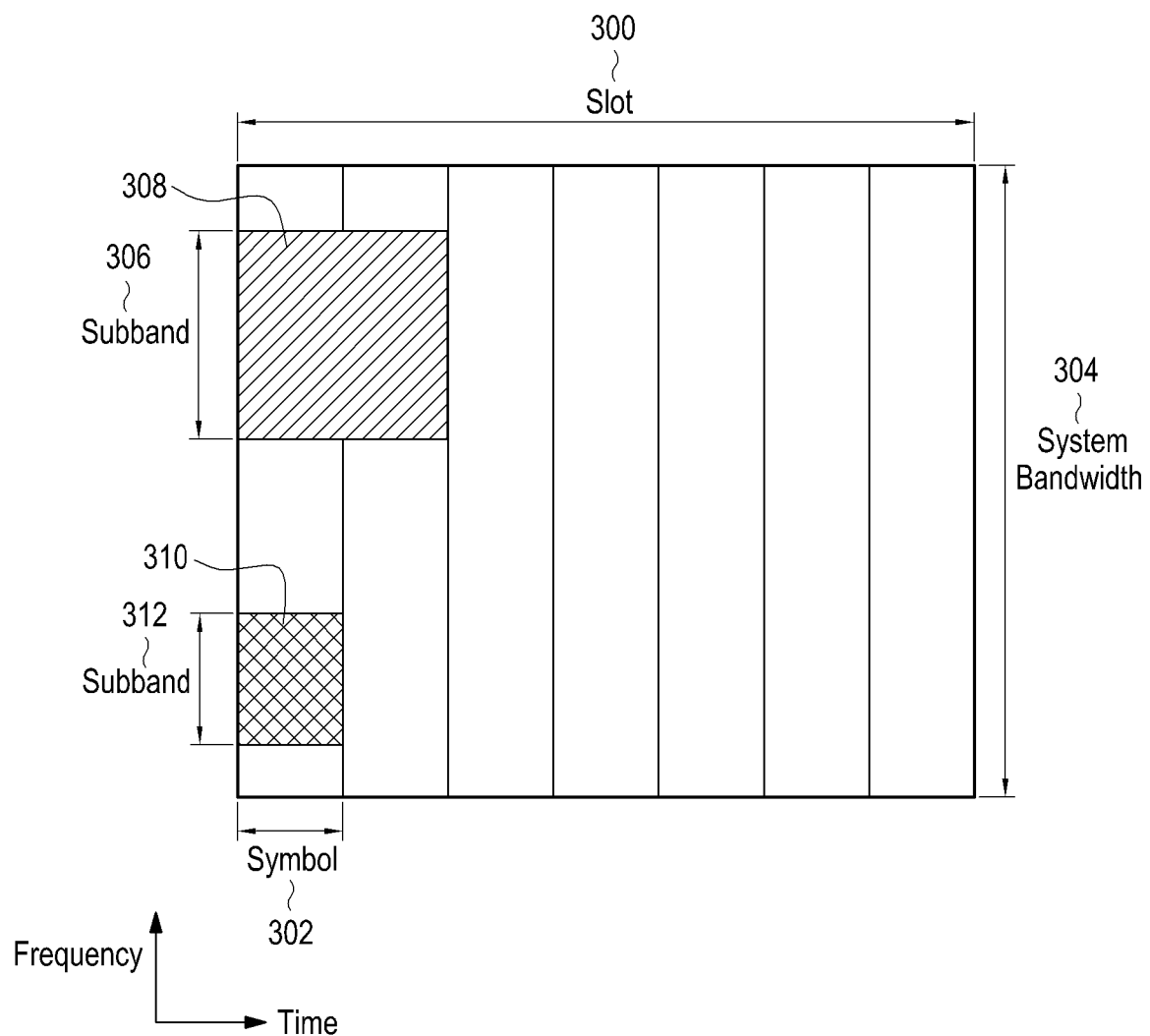
FIG. 3 illustrates a structure for downlink control information transmission in a next-generation communication system, according to an embodiment.

FIG. 3 illustrates a structure for DCI transmission in a next-generation communication system, according to an embodiment.

Referring to FIG. 3, one slot 300 may include seven OFDM symbols 302. Although one slot 300 includes a total of seven OFDM symbols in FIG. 3, the present disclosure is not limited thereto and may be applied to other slot structures in which one slot includes 14 OFDM symbols or other numbers of OFDM symbols. Meanwhile, when a terminal receives a control resource set (CORESET) through a downlink control area as DCI in units of slots 300, each of which includes seven OFDM symbols 302, the terminal may determine how many symbols are occupied by the downlink control area 308 or 310 of the terminal in a partial frequency band (sub-band) 306 or 312 among the entire system frequency band 304, through the processes described below.

The terminal may obtain downlink control area information of the terminal through a higher layer signal (e.g., SIB, RRC, MAC, or CE) or a physical signal (an all-terminal common channel, a terminal group common channel, or a terminal-specific channel) at the time of initial system access. The terminal detects its own DCI through a downlink control area configured for the terminal within one slot 300. For example, according to a specific condition, even when a plurality of downlink control areas are configured for the terminal within one slot, the terminal may detect the DCI in one downlink control area or some downlink control areas among the configured downlink control areas. The specific condition may include at least one condition among conditions relating to whether a numerology, such as subcarrier spacing, is identical (or similar) to a numerology for the configured downlink control area, or whether the bandwidth part actually operated by the terminal in the entire system frequency band includes a downlink control area. Meanwhile, a plurality of downlink control areas may be configured to have different sizes or the same size for configured frequency sections 306 and 312 as a higher layer signal or a physical signal for a terminal. One downlink control area may be configured by one symbol or several symbols. Terminal-specific downlink control information, terminal group common downlink control information, all terminal common downlink control information, or a combination thereof may exist in the downlink control area.

The control area 306 or 312 may be considered as a CORESET, a terminal-specific search space, or a terminal-common search space.

Figure 4:
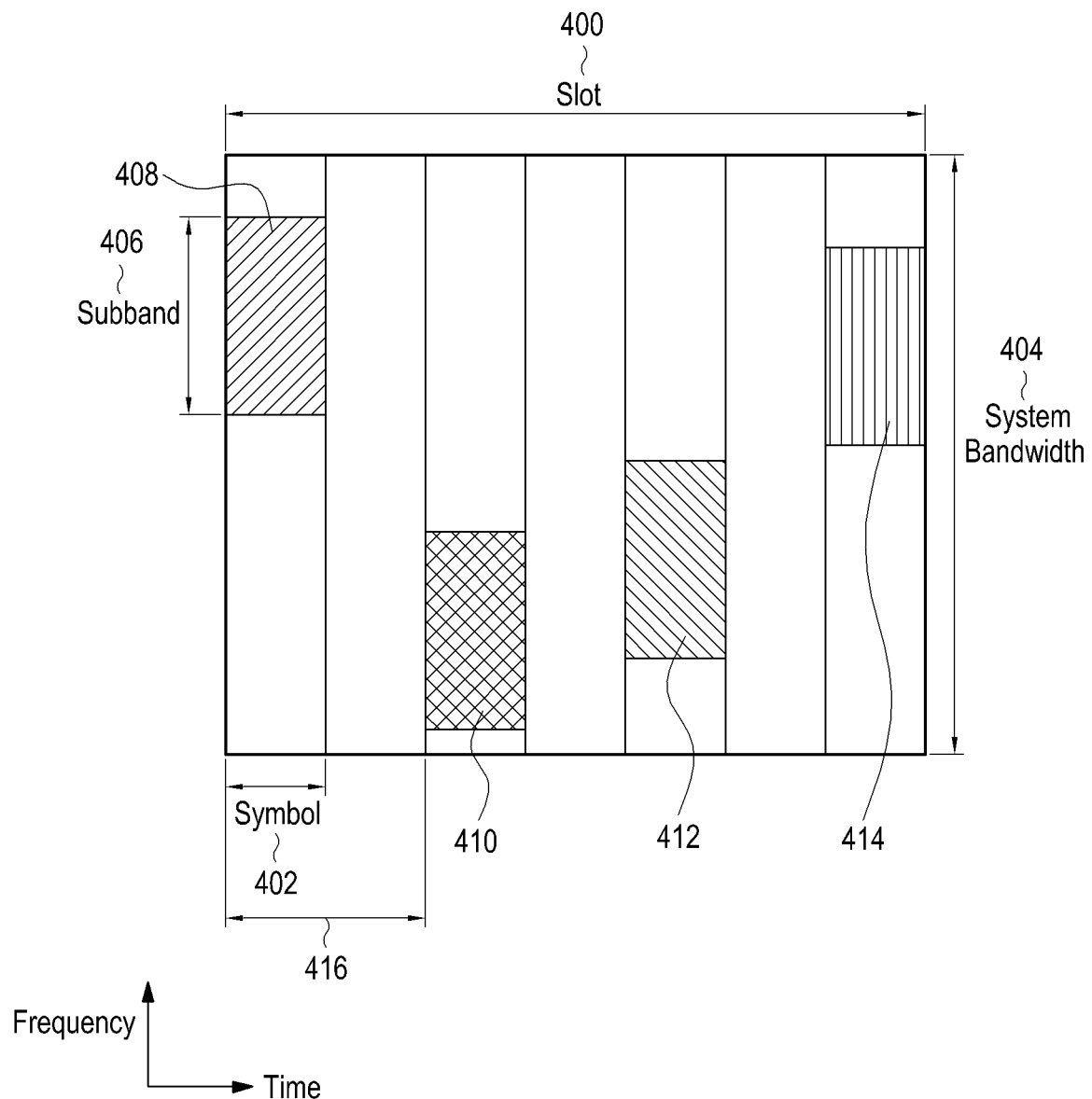
FIG. 4 illustrates a structure for downlink control information transmission in a next-generation communication system, according to an embodiment.

FIG. 4 illustrates a structure for downlink control information transmission in a next-generation communication system, according to an embodiment.

Referring to FIG. 4, a terminal may receive a configuration of a downlink control area search interval 416 from a BS. Specifically, the terminal may receive an adaptive configuration of the downlink control area search interval 416 in units of a single symbol or multiple symbols or in units of a single slot or multiple slots from a BS. The process of the configuration may be performed by a higher layer signal or physical signal. One downlink control area search interval 416 includes two OFDM symbols. However, this is merely an example and the present disclosure is not limited thereto.

In each downlink control area search interval 416 configured for the terminal by the BS (i.e., in every two OFDM symbols as shown in FIG. 4), the terminal may search for DCI within the downlink control areas 408, 410, 412, and 414 having the same frequency band or different frequency bands. The downlink control area search intervals 416 may have different numbers of downlink control areas configured therein, and the sizes of the frequency and time resources of the downlink control areas may have (entirely or partly) the same value or completely different values. Further, downlink control areas configured in each downlink control area search interval 416 may contain different types or different numbers of pieces of DCI configured for the terminal. Further, in the downlink control areas configured in each downlink control area search interval 416, the terminal may search for downlink information a different numbers of times. Further, in the downlink control areas configured in each downlink control area search interval 416, different types of control channel element (CCE) aggregation levels may be configured in order to transfer the DCI or blind decoding may be applied for each CCE aggregation level may be performed a different numbers of times. The situations described above may be applied to different downlink control areas existing within the same search interval. Further, a control channel search area may be aperiodically configured for the terminal. For example, the control channel search areas may include different numbers of symbols (or slots) instead of always including the same number of symbols (or slots).

The downlink control area described above may include frequency information in units of RBs or REs and may include time interval information in units of symbols and symbol offsets based on a transmission period or slot boundary. Further, the downlink control area may be configured for each frequency band width period (BWP).

Figure 5:
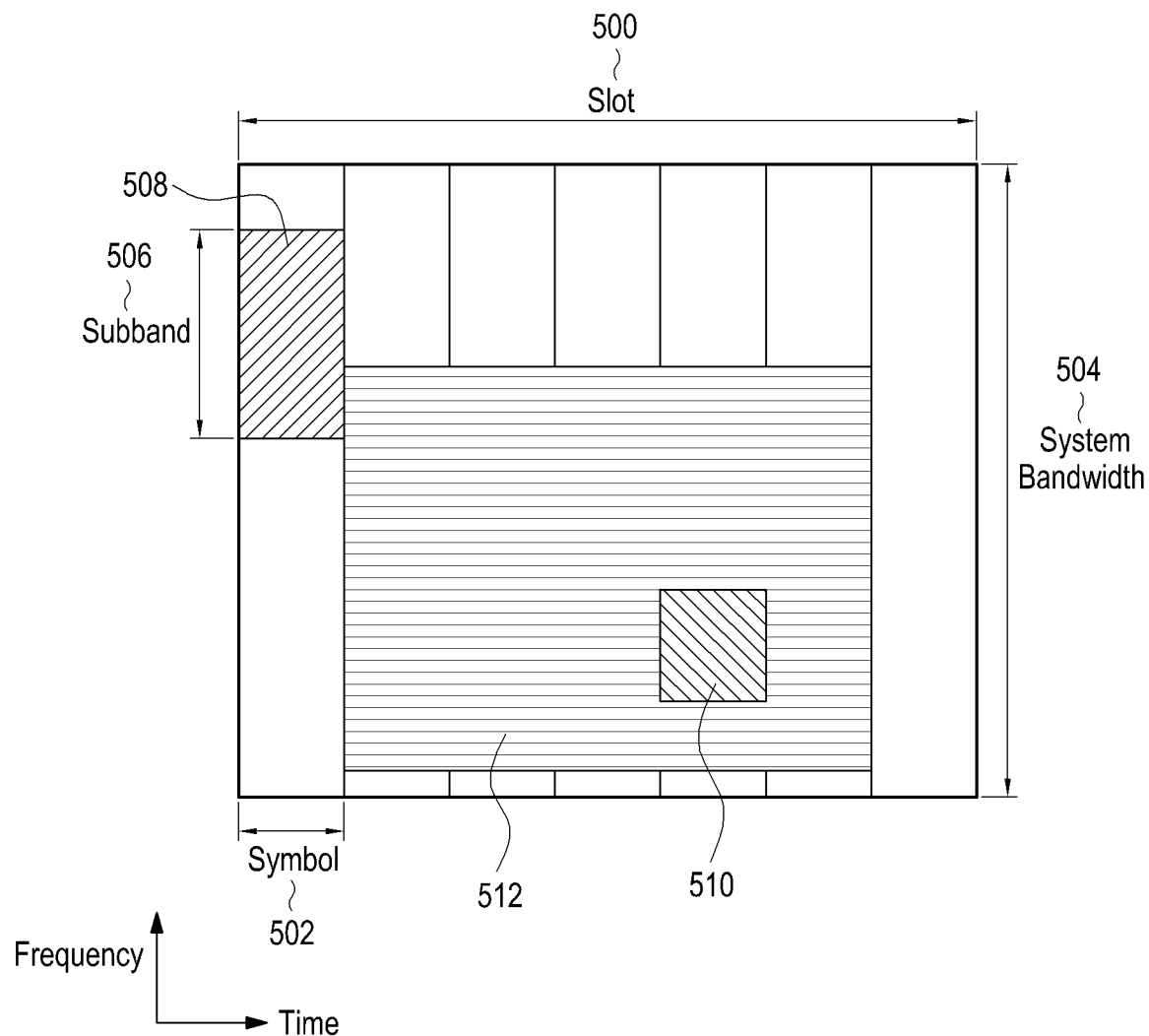
FIG. 5 illustrates a structure for transmission of downlink control information and downlink data information in a next-generation communication system, according to an embodiment.

FIG. 5 illustrates a structure for transmission of DCI and downlink data information in a next-generation communication system, according to an embodiment.

FIG. 5 shows a situation in which a downlink data area 512 scheduled in a downlink control area 506 overlaps a subsequent downlink control area 510. A terminal may receive a configuration of a DCI search interval through a higher layer signal or a physical signal. Referring to FIG. 5, when a DCI search interval is configured for every four OFDM symbols, a terminal may perform a downlink control area search in the first OFDM symbol. As shown in FIG. 5, when the downlink control information searched in the downlink control area has a particular sub-band in the frequency domain and a scheduled downlink data area 512 including a total of five OFDM symbols from the second OFDM symbol in the time domain, the downlink control area 510 pre-configured at the fifth OFDM symbol may partly or entirely overlap the downlink data area 512 located at the first OFDM symbol scheduled from the DCI within the downlink control area 508. FIG. 5 shows a situation in which only one downlink control area 512 overlaps a downlink data area 510. However, the present disclosure is not limited thereto and may be applied to other situations in which two or more downlink control areas overlap a downlink data area. Further, the terminal may determine that downlink data information has been mapped to only the downlink data area remaining after excluding the subsequent downlink control area 510 from the scheduled downlink data area 512 and may receive data information in only the downlink data area remaining after excluding the subsequent downlink control area 510. Physical channel mapping of the downlink data information may be performed in the following two methods.

First, downlink data information may be mapped in the smallest frequency/time resource allocation units (i.e., in RE units) in the remaining downlink data area except for the downlink control area 510 overlapping the downlink data area 512. Here, the number of available REs of a physical channel considered when the downlink data information is mapped to a physical channel may have a value obtained by excluding the number of total available REs (REs except for REs for RS) within the downlink control area 510 overlapping the downlink data area 512 from the number of total available REs within the configured downlink data area 512. Therefore, the coding rate may be higher than when no downlink control area 510 is included in overlapping the downlink data area 512, and the terminal may obtain the coding rate by previously calculating the number of REs or receiving a particular value (alpha) therefor from the BS. This method may be referred to as rate-matching. In the rate-matching method, a scheduled downlink data physical channel area overlapping a downlink control area may be excluded from the beginning of downlink data information mapping.

A second coding rate method is to map downlink data information to the scheduled downlink data area 512 regardless of the downlink control area 510 overlapping the downlink data area 512. The BS does not actually map downlink data information to the downlink data area 510 overlapping the downlink control area 512. However, the BS may assume that the downlink data information has been mapped thereto, and map the downlink data information to the other downlink data area. Meanwhile, the terminal assumes that there is no actual downlink data information in the downlink data area overlapping the downlink control area 510, and may receive downlink data information in the other area. In this case, the coding rate may have the same value regardless of whether the downlink data area 512 overlaps the downlink control area 510. This method may be referred to as puncturing. In the puncturing method, a scheduled downlink data physical channel area overlapping a downlink control area is taken into account in the downlink data information mapping. However, the BS may not use that area in actual mapping and transmission.

That is, since actual downlink data information is not mapped in the downlink control area 510 overlapping the downlink data area 512, the terminal may search for all pre-configured DCI in the downlink control area 510. Further, since actual downlink data information is not mapped in the downlink control area 510 overlapping the downlink data area 512, the terminal may search for only a part of pre-configured DCI in the downlink control area 510.

The partial DCI searching, described above, refers to searching for a smaller number of pieces of DCI than a pre-configured number, searching for each piece of DCI a less than a pre-configured number of times, or searching in a part of control areas (when two or more downlink control areas overlap the downlink data area), or some combinations thereof. The partial DCI searching can reduce the number of times blind DCI decoding is performed in the downlink control area overlapping the downlink data area, in comparison with the number of times blind DCI decoding is performed in the downlink control area not overlapping the downlink data area. The overlapping may imply overlapping in both the time domain and the frequency domain, or overlapping in only one of the time domain and the frequency domain.

Further, the temporal size of the scheduled downlink data area may be larger than a slot, and a time unit may be configured by a single OFDM symbol or several OFDM symbols.

Meanwhile, the overlapping situation may occur when a terminal receives downlink data information having a time length longer than a DCI search interval configured by a BS; when a downlink data area scheduled through DCI of a downlink control area in a particular DCI search interval (e.g., the Nth search interval) includes a DCI search interval (e.g., the (N+1)th search interval) subsequent to the particular DCI search interval; and when a downlink control area overlapping the other downlink data area excluding the downlink control area (CORESET or search space) indicating downlink data area are scheduled. Further, the overlapping situation may occur in the case of overlapping (in time or frequency, or in both time and frequency) particular downlink data area scheduled through DCI within another downlink control area before the time point when the particular downlink control area exists.

Although FIG. 5 shows an embodiment in which the downlink data area 512 exists in a single slot, the area may extend over another slot. That is, the length of the downlink data area 512 may be determined by the number of symbols, the number of slots, or a combination thereof. Further, although FIG. 5 shows continuous downlink data area scheduling, discontinuous downlink data area may also be scheduled. Additionally, although FIG. 5 shows an example having the same subcarrier spacing (or symbol length), different subcarrier spacings (or symbol lengths) may also be arranged. Although FIG. 5 shows an example in which a downlink control area 508 and a subsequent downlink control area 510 exist within the same slot and a period between the two areas corresponds to four symbols, a time interval between temporally continuous downlink control areas may be determined in units of symbols, slots, or combinations thereof. Also, although FIG. 5 shows an example having a periodic interval between downlink control areas, aperiodic intervals may be configured therebetween. That is, the interval between downlink control areas may be configured by different symbols, different slots, or combinations thereof, instead of the same symbols, the same slots, or combinations thereof. The configurations described above may be applied equally or similarly to all the situations suggested by the present disclosure, as well as the embodiment shown in FIG. 5.

In the case of using beamforming in FIG. 5, it can be determined that the same beamforming-related parameters (e.g., precoding) as those applied in the downlink data area 512 scheduled in the downlink control area 508 has been applied to the subsequent downlink control area 510. That is, in a situation in which different beamforming-related parameters can be applied to the downlink control area and the downlink data area, when a scheduled downlink data area and a subsequent downlink control area overlap, the terminal may implicitly or internally determine that a beamforming-related parameter configured for downlink data area is identically applied to a subsequent downlink control area also.

In the present disclosure, the situations relating to the downlink data areas may be applied to uplink data areas as well.

Figure 6:
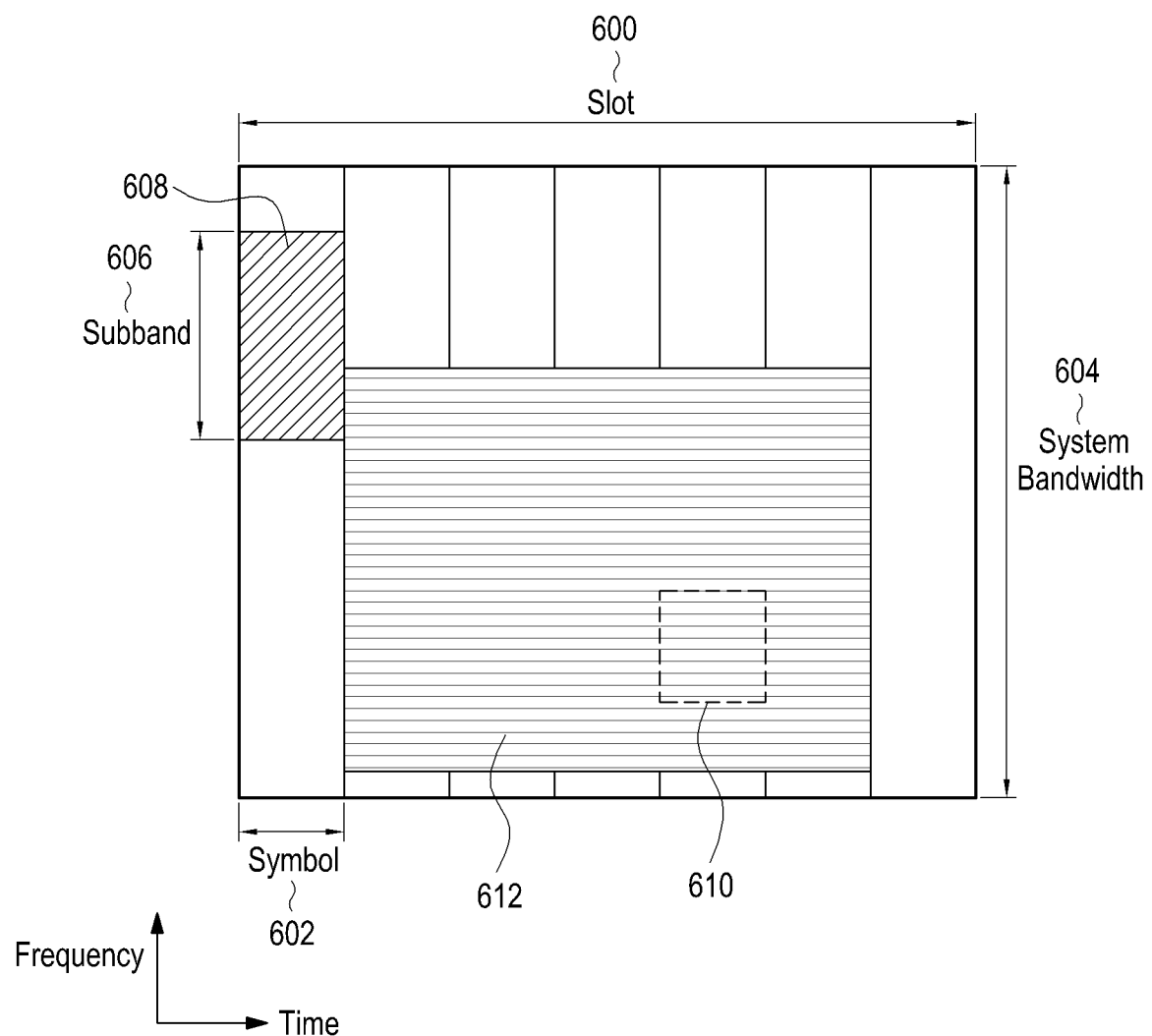
FIG. 6 illustrates a structure for transmission of downlink control information and downlink data information in a next-generation communication system, according to an embodiment.

FIG. 6 illustrates a structure for transmission of DCI and downlink data information in a next-generation communication system, according to an embodiment.

FIG. 6 is similar to FIG. 5, described above, however, DCI is not transferred to the terminal in the subsequent downlink control area 610 overlapping the scheduled downlink data area 612, and the subsequent downlink control area 610 includes downlink data information for the downlink data area.

The subsequent downlink control area 610 may be a sub-frequency interval configured as a control area, a search space, or a CORESET area configured by a combination of time or frequency areas. In the entire scheduled downlink data area 612 (including an overlapping downlink control area), the terminal may assume the existence of downlink data information and receive downlink data information (including the already-configured downlink control area). Meanwhile, the BS considers the downlink control area 610 overlapping the downlink data area 612 scheduled at a previous time point (through DCI within another downlink control area), as a downlink data area for transmission of downlink data information, and may transmit or receive downlink data information in the downlink data area 612.

Further, the terminal may not perform (or may omit) a downlink data information search in the downlink control area 610 overlapping the downlink data area 612 scheduled at a previous time point (through DCI within another downlink control area).

Figure 7:
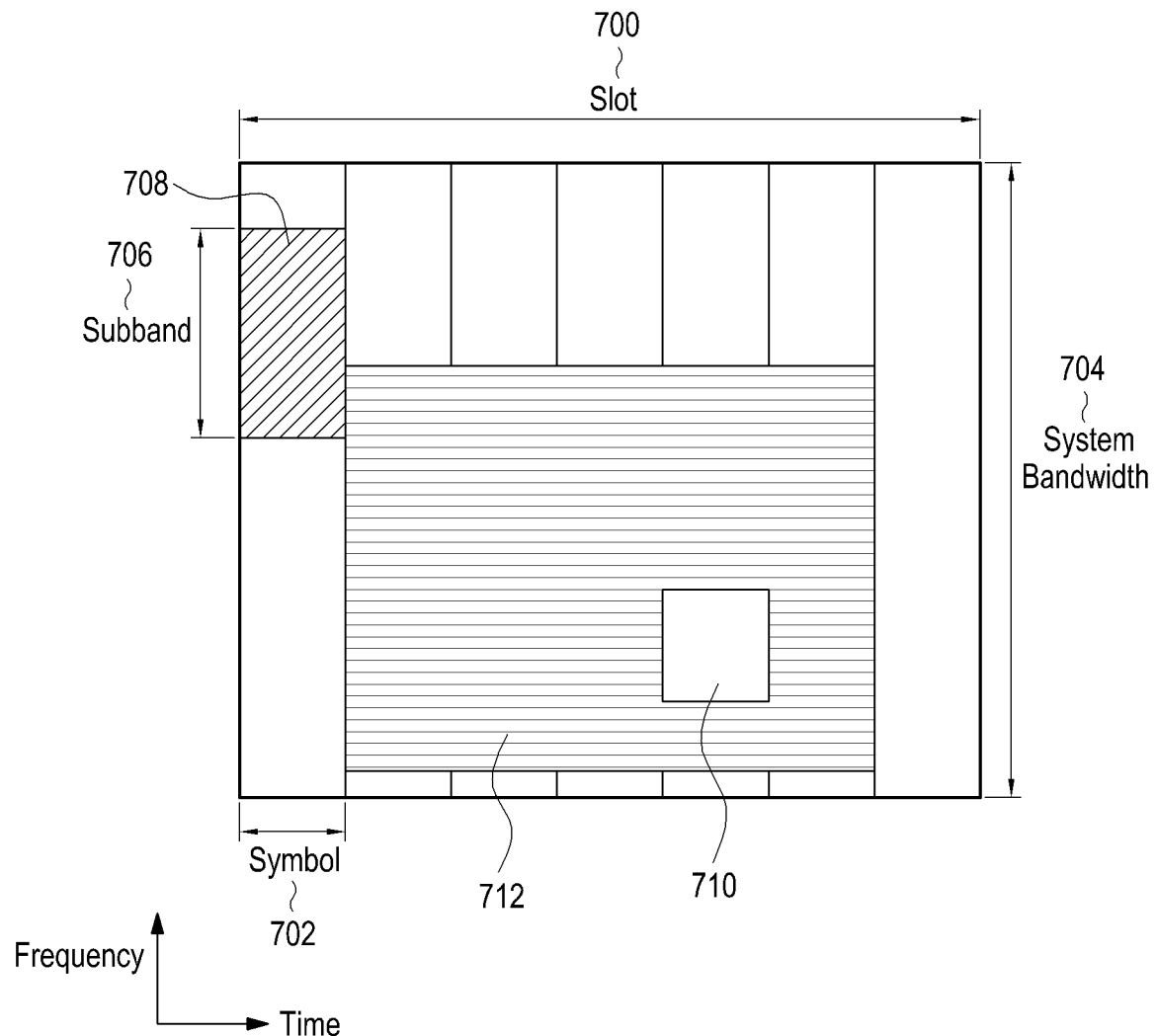
FIG. 7 illustrates a structure for transmission of downlink control information and downlink data information in a next-generation communication system, according to an embodiment.

FIG. 7 illustrates a structure for transmission of DCI and downlink data information in a next-generation communication system, according to an embodiment.

FIG. 7 is similar to FIG. 5, described above. However, in the embodiment in FIG. 7, although the downlink control area 710 overlapping the scheduled downlink data area 712 is not used as a downlink data area, the BS does not transfer DCI to the terminal and may not perform (or may omit) a DCI search in the downlink control area 710 overlapping (in time or frequency, or both) the downlink data area 712 scheduled at a previous time point (through DCI within another downlink control area), while receiving downlink data information in the scheduled downlink data area.

Figure 8:
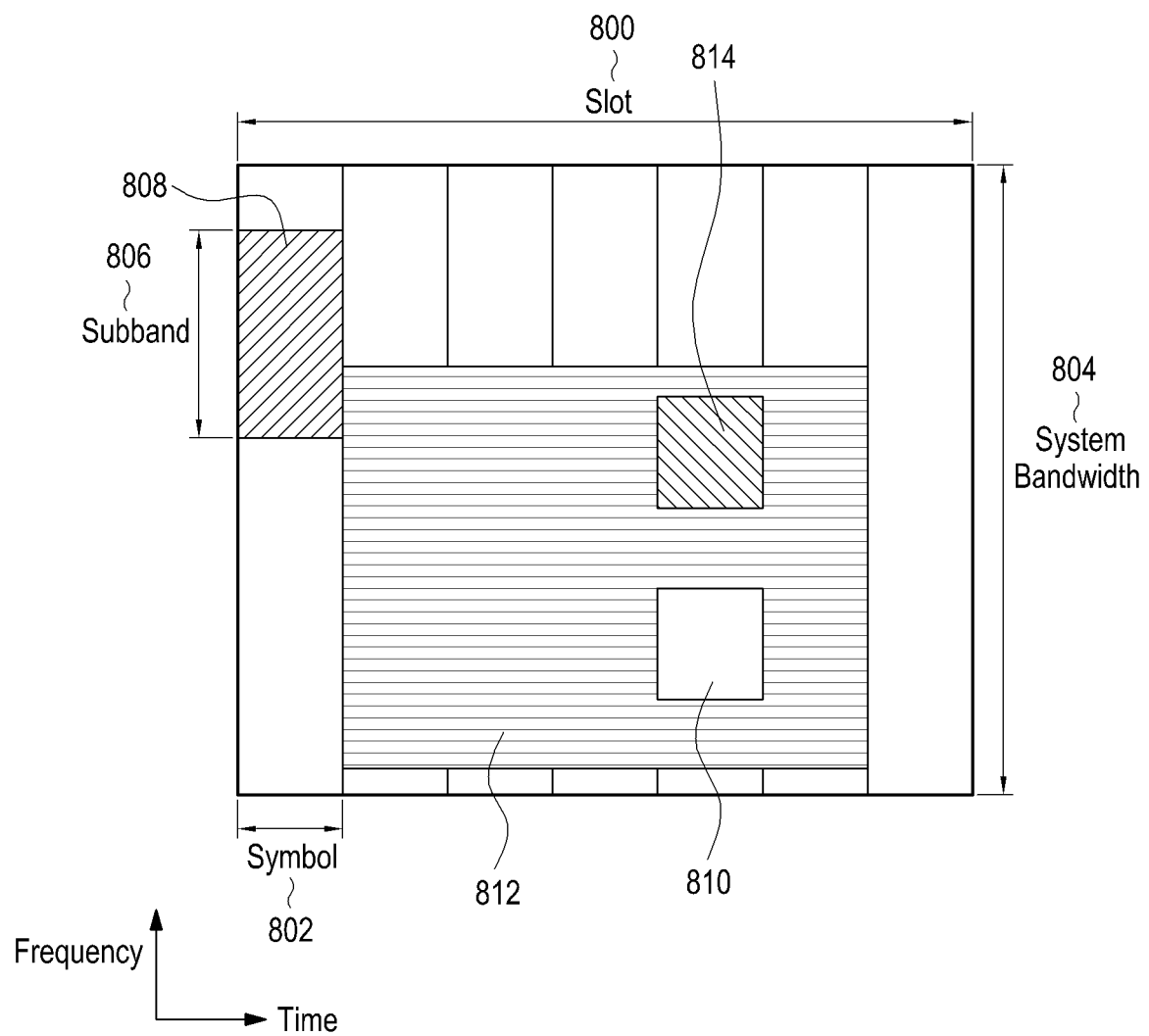
FIG. 8 illustrates a structure for transmission of downlink control information and downlink data information in a next-generation communication system, according to an embodiment.

FIG. 8 illustrates a structure for transmission of DCI and downlink data information in a next-generation communication system, according to an embodiment.

FIG. 8 corresponds to a situation in which the embodiments in FIG. 5 and FIG. 7, described above, overlap. However, in the situation of FIG. 8, the terminal does not perform (or omits) a DCI search in a downlink control area 810 among downlink control areas overlapping (in time or frequency, or in both time and frequency) the downlink data area 812 scheduled at a previous time point (through DCI within another downlink control area), while receiving downlink data information in the scheduled downlink data area, and may perform a DCI search in another overlapping downlink control area 814.

A criterion for determining whether to perform a DCI search in at least one of the downlink control areas 810 and 814 may change according to the type of the DCI transmitted in the downlink control areas, which corresponds to all terminals, terminal group, or a specific terminal. For example, the DCI search may be performed when DCI of an all terminal type or a terminal group type is transferred in at least one of the downlink control areas 810 and 814. In another example, the DCI search may not be performed when terminal-specific type DCI is transferred in at least one of the downlink control areas 810 and 814. Further, whether to search for DCI may be determined according to a configured numerology as well as the DCI type.

Further, the decision of whether to search for DCI may be determined according to a length configured as a DCI-specific search interval (i.e., a DCI search may be performed by a cycle of x symbols). For example, when there are a total of two DCI search intervals, including one interval configured for each slot and the other interval configured for every two symbols, a search may be performed in the DCI search area having a cycle of one slot while a search is not performed in the DCI search area having a cycle of two symbols. In another example, a search may not be performed in the DCI search area having a cycle of one slot while a search is performed in the DCI search area having a cycle of two symbols (that is, the opposite case is possible).

Figure 9:
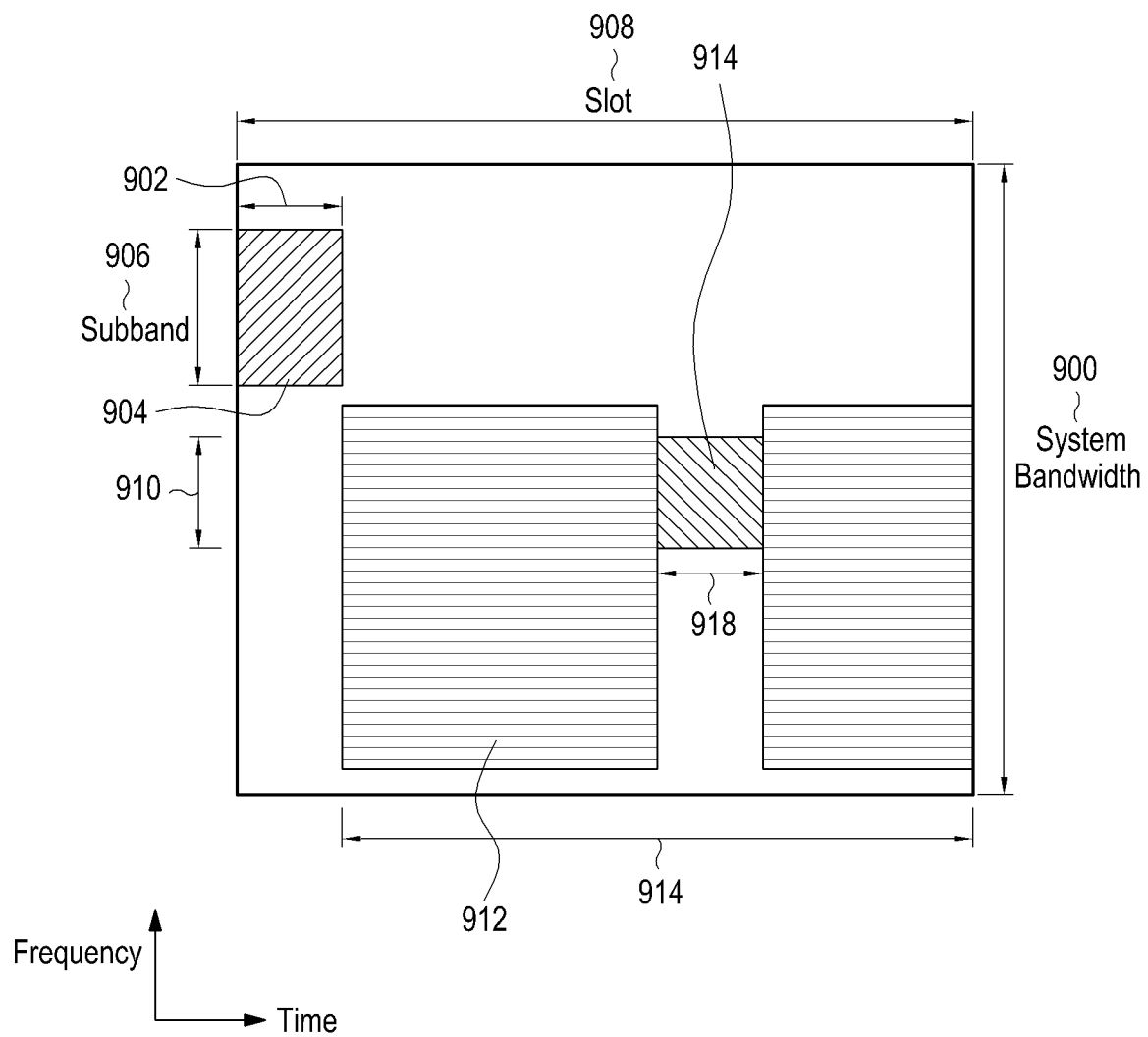
FIG. 9 illustrates a structure for transmission of downlink control information and uplink data information in a next-generation communication system, according to an embodiment.

FIG. 9 illustrates a structure for transmission of DCI and uplink data information in a next-generation communication system, according to an embodiment.

In FIG. 9, a BS and a terminal basically operate using a TDD structure. In FIG. 9, reference numerals 902 and 908 indicate downlink intervals, and all intervals except for those indicated by 902, 908, 914 and 918 are uplink intervals. The terminal may receive a configuration of an uplink data area 912 through DCI within a downlink control area 904 of a downlink interval 902 and transmit uplink data information 912 in the configured area. Here, the uplink data area 912 configured through the DCI may partially overlap the downlink control area 914 of the subsequent downlink interval 918 (with respect to the time domain). The downlink control area interval 902 may be configured by one symbol or several symbols. Further, the uplink data area 912 scheduled through DCI within the downlink control area may be configured by one symbol or several symbols, several mini-slots, or several slots. Meanwhile, the downlink control area search cycle may be configured by one symbol or several symbols, several mini-slots, or several slots.

Further, the BS transmits DCI in a downlink control area temporally overlapping the uplink data area, and may not receive uplink data information in the interval 918 if it is assumed that there is no uplink data area. That is, the BS may switch an uplink interval to a downlink interval in a downlink control area temporally overlapping the uplink data area and transmit DCI in the switched interval. After completing the transmission of the DCI, the BS may switch back the downlink interval to an uplink interval and receive uplink data information during the remaining intervals of the scheduled uplink data area 912.

The terminal may switch an uplink interval to a downlink interval in a downlink control area temporally overlapping the uplink data area and search for control information in the downlink control area. Further, the terminal may switch back the downlink interval to an uplink interval and transmit uplink data information during the remaining intervals of the scheduled uplink data area 912.

The uplink data information may be mapped to a physical channel according to the following two methods.

First, a method is provided in which uplink data information may be mapped in the smallest frequency/time resource allocation units (i.e., in units of Res), in the remaining uplink data area except for the downlink control area 914 temporally overlapping the uplink data area. Here, the number of available REs of a physical channel considered when the uplink data information is mapped to a physical channel may have a value obtained by excluding the number of total available REs (REs except for REs for RS) within the uplink data area 912 temporally overlapping the downlink control area from the number of total available REs (REs except for REs for RS) within the scheduled uplink data area 912. Therefore, in this case, the coding rate is higher than that in the case of including no downlink control area 914 temporally overlapping the uplink data area, and the terminal may obtain the coding rate by previously calculating the number of REs or receiving a particular value (alpha) from the BS. This method may be referred to as rate-matching. In the rate-matching method, a scheduled uplink data physical channel area temporally overlapping a downlink control area may be excluded from the beginning of a transmission for the uplink data information mapping.

The second method for mapping uplink data information is to map uplink data information to the scheduled uplink data area 912 regardless of the downlink control area 914 temporally overlapping the uplink data area. The BS does not actually map uplink data information to the uplink data area temporally overlapping the downlink control area. However, the BS may assume that the uplink data information has been mapped thereto, and map the uplink data information to another uplink data area. The terminal may assume that there is no actual uplink data information in an uplink data area temporally overlapping the downlink control area, and may receive uplink data information in another area. In this case, the coding rate may have the same value regardless of whether the uplink data area overlaps the downlink control area. This method may be referred to as puncturing. In the puncturing method, a scheduled uplink data physical channel area temporally overlapping a downlink data area is taken into account in the uplink data information mapping. However, the terminal may not use that area in actual mapping and transmission.

The terminal may not transmit uplink data in an uplink data area temporally overlapping the downlink control area and, instead, may switch the uplink interval to a downlink interval and use the switched interval for searching downlink data information.

Figure 10:
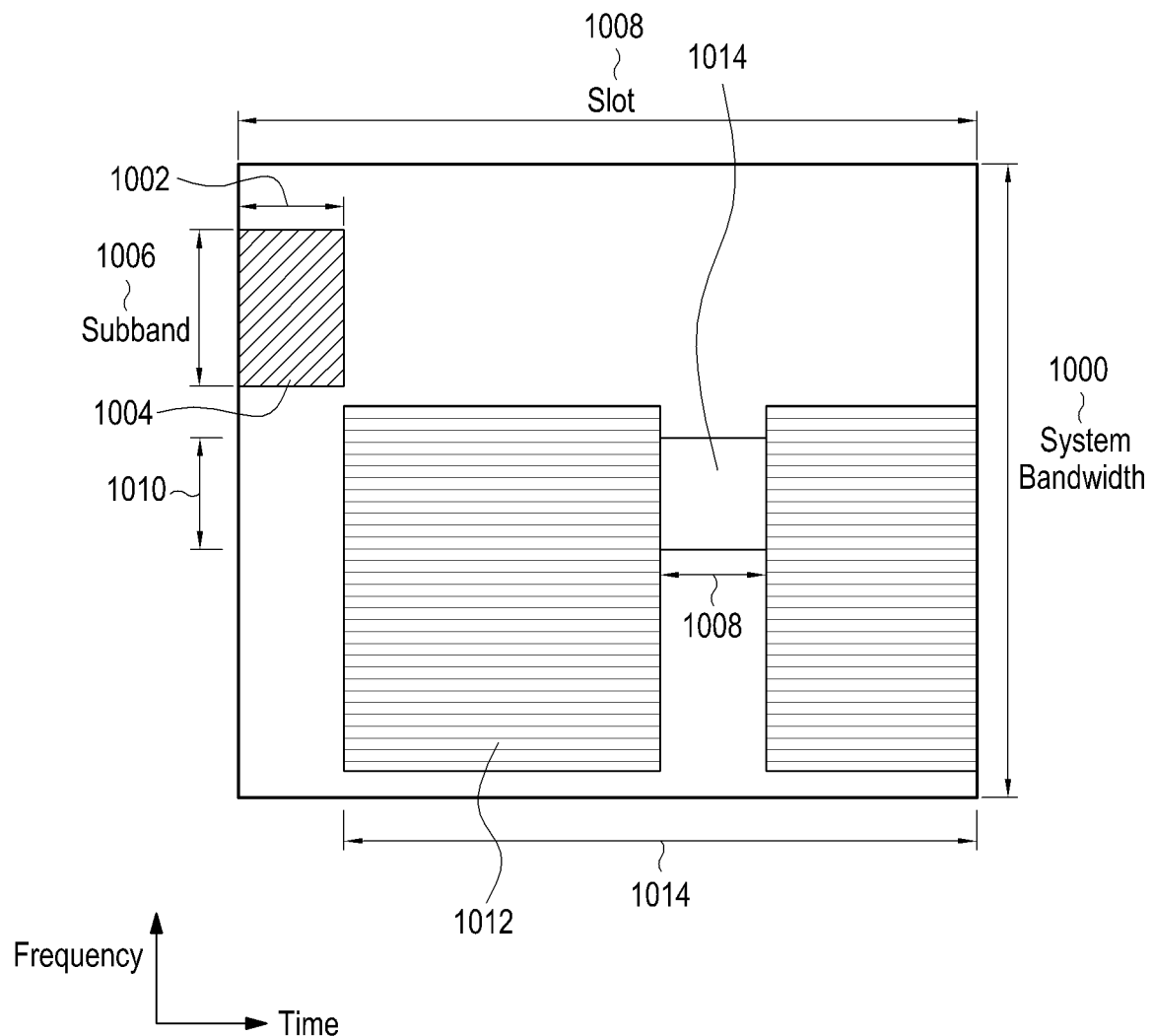
FIG. 10 illustrates a structure for transmission of downlink control information and uplink data information in a next-generation communication system, according to an embodiment.

FIG. 10 illustrates a structure for transmission of DCI and uplink data information in a next-generation communication system, according to an embodiment.

FIG. 10 is similar to FIG. 9, described above, however, in the embodiment of FIG. 10, the BS may not transmit control information to a terminal, for which an uplink data area 1014 is scheduled, through a downlink control area 1018 temporally overlapping the scheduled uplink data area, in the downlink control area. Further, for the downlink control area 1018 temporally overlapping the scheduled uplink data area 1014, the terminal does not switch an uplink interval to a downlink interval, either. Moreover, the terminal does not perform an additional switching into a downlink interval. Therefore, the terminal may not perform a pre-configured DCI search. That is, in the uplink interval without change, the terminal may only stop uplink data information transmission during the temporally overlapping interval 1018. Further, after termination of the interval, the terminal may perform uplink data information transmission again. Therefore, the terminal need not perform switching from an uplink interval to a downlink interval and from a downlink interval to an uplink interval, and thus can achieve reduction in the power consumption thereof. This situation may either always be applied to all terminals or be applied to a particular terminal in a specific situation. That is, both the BS and the terminal may disregard (or omit) operations of transmission and reception of DCI in a downlink control area temporally overlapping an uplink data area scheduled at a previous time point through DCI of a downlink control area 1104.

For example, this operation can be performed by terminals having a predetermined HARQ process number or lower (i.e., supporting only one HARQ process). Although only one downlink control area temporally overlaps an uplink data area in FIG. 10, two or more overlapping downlink control areas may also exist, and the above description may be identically applied to the latter case as well.

Figure 11:
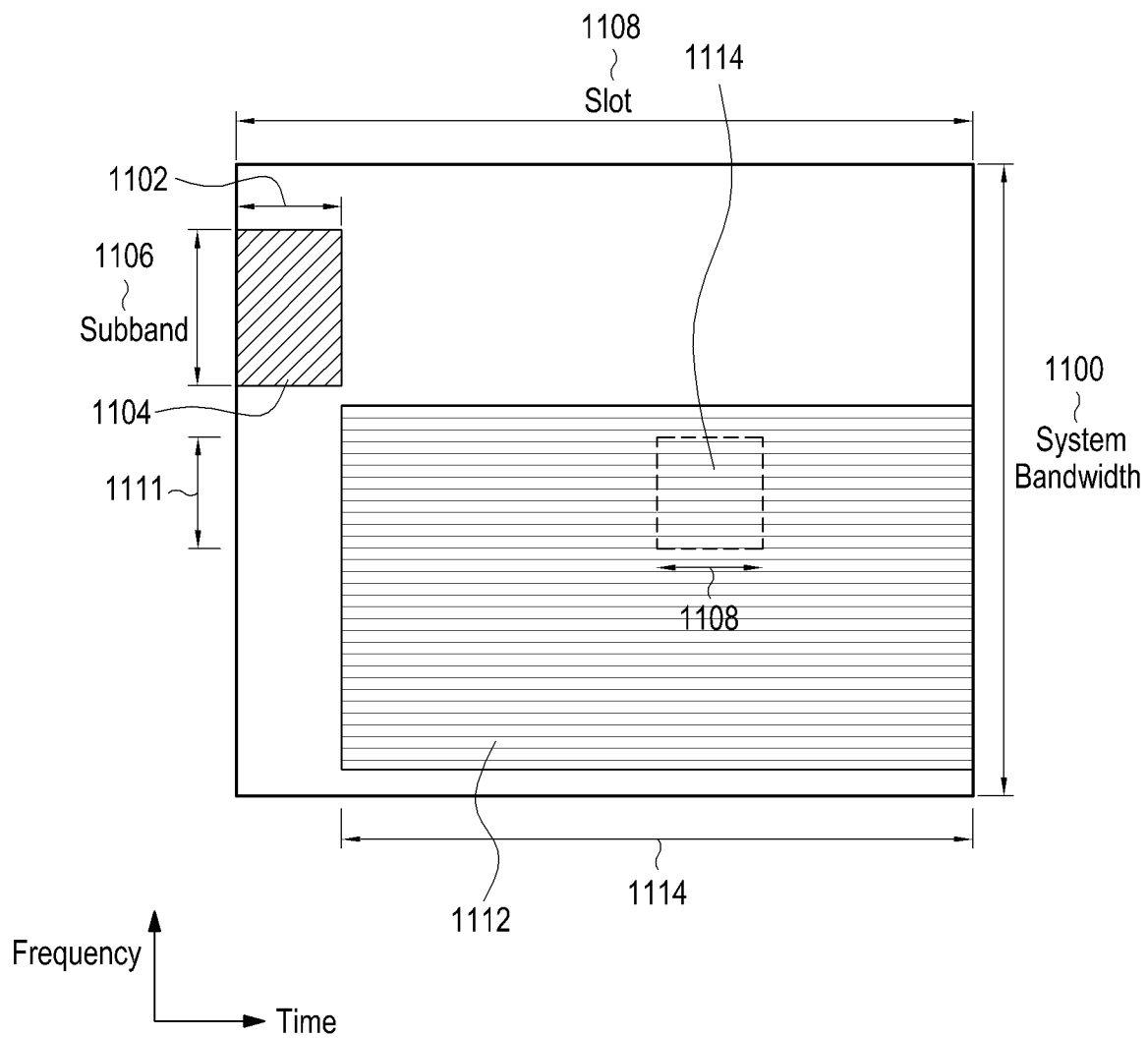
FIG. 11 illustrates a structure for transmission of downlink control information and uplink data information in a next-generation communication system, according to an embodiment.

FIG. 11 illustrates a structure for transmission of DCI and uplink data information in a next-generation communication system, according to an embodiment.

FIG. 11 is similar to FIG. 9, described above, however, in the embodiment of FIG. 11, both the BS and the terminal may assume that an uplink data area 1112 scheduled at a previous time point through DCI of a downlink control area 1104 is configured to include a temporally overlapping downlink control area 1114, and uplink data information is transmitted according to the corresponding area. According to the corresponding operations, transfer of the DCI in the overlapping downlink control area 1114 may not be performed. The terminal may perform uplink data transmission on an assumption that the entire uplink data area 1112 scheduled in the downlink control area 1104 has been configured as an uplink interval. The BS may either receive uplink data information in an interval 1118 including a temporally overlapping downlink control area 1114, among the uplink data area 1112 scheduled in the downlink control area 1104, or switch the interval to a downlink interval and transmit DCI to another terminal in the switched interval. At this time, the BS may be unable to receive, in the interval 1118, a part of the uplink data information having been transmitted through the uplink data area 1112 scheduled through the DCI. That is, the terminal may operate as in FIG. 11, while the BS operates as in FIG. 9 or FIG. 10.

Figure 12:
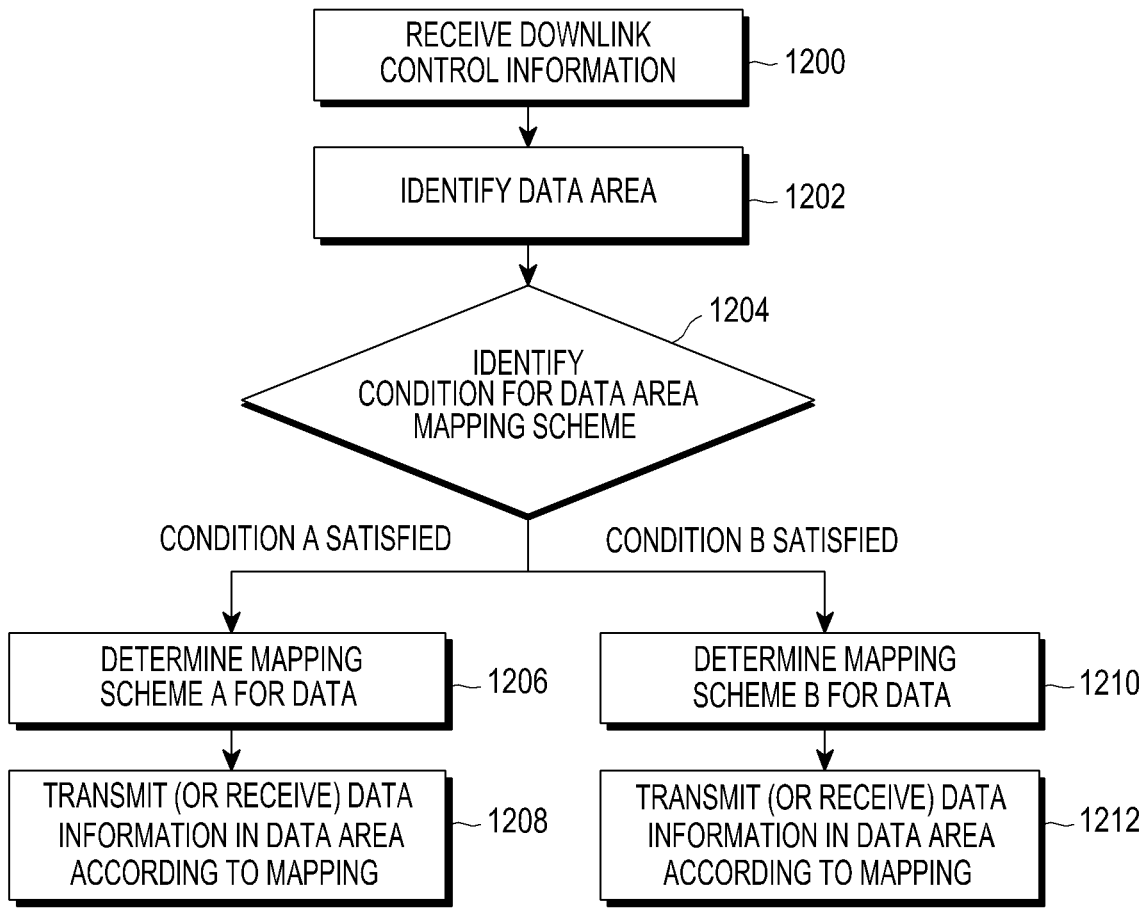
FIG. 12 is a flowchart illustrating a method of receiving or transmitting a data area by a terminal, according to an embodiment.

FIG. 12 is a flowchart illustrating a process of receiving or transmitting a data area by a terminal, according to an embodiment.

Referring to FIG. 12, the terminal may receive downlink control information at step 1200. Further, the terminal may identify scheduling of a data area through the received DCI at step 1202. Then, the terminal may identify a condition for identifying a scheme in which data information is mapped to a data physical channel area, from the scheduled data area at step 1204.

The condition identified in step 1204 may include at least one of condition A and condition B. In the embodiment in FIG. 12, operations are based on a determination of condition A and condition B.

Condition A may include one of the following cases (1-5):

1) when mapping scheme A is indicated through a physical signal, such as an L1 signal;

2) when mapping scheme A is indicated through a higher layer signal, such as SIB, RRC, MAC, or CE;

3) when the control information including the configuration information is detected and the terminal has been instructed, through the configuration information, to employ mapping scheme A, or when the control information not including the configuration information is detected and the terminal has been previously instructed, through a higher layer signal, to employ a mapping scheme A (i.e., this may be a combination of the methods described above, where both control information including a mapping scheme as configuration information and control information not including a mapping scheme may be simultaneously transmitted to a terminal);

4) when the terminal is only aware of transmission of the control information including the configuration information and is instructed, through the detected control information including the configuration information, to employ a mapping scheme A, or when the terminal is only aware of transmission of the control information not including the configuration information and has been previously instructed, through a higher layer signal, to employ a mapping scheme A (i.e., this may be a combination of the methods described above, where only one type of information among control information including a mapping scheme as configuration information and control information not including a mapping scheme may be allowed to be transmitted to a terminal); and 5) a mapping scheme A has been determined according to a standard.

Condition B may include one of the following cases (1-5):

1) when mapping scheme B is indicated through a physical signal, such as an L1 signal;

2) when mapping scheme B is indicated through a higher layer signal, such as SIB, RRC, MAC, or CE;

3) when the control information including the configuration information is detected and the terminal has been instructed, through the configuration information, to employ mapping scheme B, or when the control information not including the configuration information is detected and the terminal has been previously instructed, through a higher layer signal, to employ mapping scheme B (i.e., this may be a combination of the methods described above, where both control information including a mapping scheme as configuration information and control information not including a mapping scheme may be simultaneously transmitted to a terminal);

4) when the terminal is only aware of transmission of the control information including the configuration information and is instructed, through the detected control information including the configuration information, to employ mapping scheme B, or when the terminal is only aware of transmission of the control information not including the configuration information and has been previously instructed, through a higher layer signal, to employ mapping scheme B (i.e., this may be a combination of the methods described above, where only one type of information among control information including a mapping scheme as configuration information and control information not including a mapping scheme may be allowed to be transmitted to a terminal); and 5) mapping scheme B has been determined according to a standard.

The terminal may determine whether mapping scheme A is satisfied or whether mapping scheme B is satisfied.

When mapping scheme A is satisfied, the terminal may determine mapping scheme A as a scheme for the scheduled data at step 1206. Mapping scheme A may refer to a scheme in which, when a downlink control area (or individual group of downlink control areas) configured for the terminal before a corresponding data area (through a downlink physical channel or higher layer signal) partially or entirely overlaps a scheduled data area, downlink data information is rate-matched to a downlink data area avoiding the downlink control area (or individual group of downlink control areas). The terminal may transmit or receive data information in the data area according to the mapping scheme at step 1208.

In mapping scheme A, when a downlink control area configured (through a downlink physical channel or higher layer channel) before a corresponding data area partially or entirely overlaps a scheduled data area, the terminal may determine that a resource area (frequency resources in units of REs or RBs and time resources in units of symbols) corresponding to the control area is not used in the data area. As an example, a resource area may be referred to as a resource set.

When mapping scheme B is satisfied, the terminal may determine mapping scheme B as a scheme for the scheduled data at step 1210. Mapping scheme B may refer to a scheme in which, when a downlink control area (or individual group of downlink control areas) configured for the terminal before a corresponding data area (through a downlink physical channel or higher layer signal) partially or entirely overlaps a scheduled data area, downlink data information is rate-matched to a downlink data area including (or avoiding) (the entirety or a part of) the downlink control area (or an individual group of downlink control areas) (or the downlink data information is mapped to a pre-configured downlink control area after the pre-configured downlink control area is punctured). The terminal may transmit or receive data information in the data area according to the mapping scheme at step 1212. In mapping scheme B, when a downlink control area configured (through a downlink physical channel or higher layer channel) before a corresponding data area partially or entirely overlaps a scheduled data area, the terminal may determine that a resource area (frequency resources in units of REs or RBs and time resources in units of symbols) corresponding to the control area is used in the data area. As an example, a resource area may be referred to as a resource set.

Figure 13:
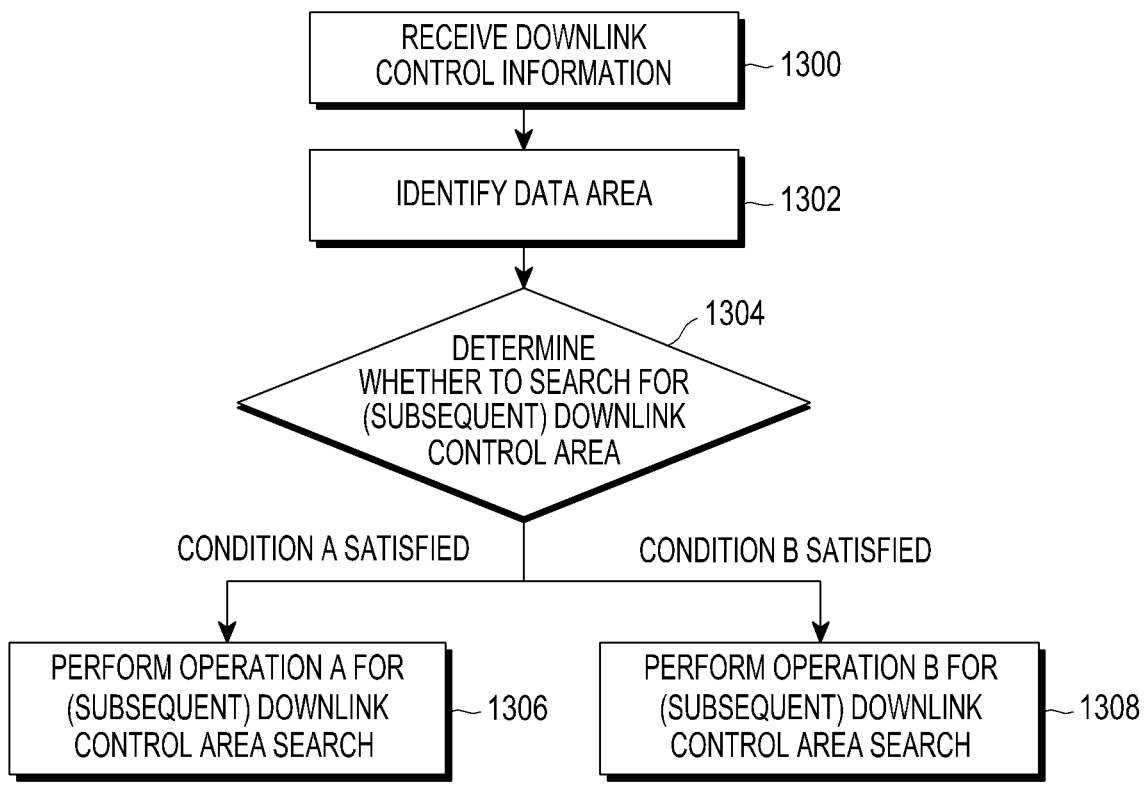
FIG. 13 is a flowchart illustrating a method of searching for a control area by a terminal, according to an embodiment.

FIG. 13 is a flowchart illustrating a method of searching for a control area by a terminal, according to an embodiment.

Referring to FIG. 13, the terminal may receive downlink control information at step 1300. Further, the terminal may identify a scheduled (uplink or downlink) data area through the received downlink control information at step 1302. The terminal may determine, through the following conditions, a search scheme for a subsequent downlink control area overlapping the scheduled data area (in time or frequency, or both time and frequency) at step 1304.

The condition identified in step 1304 may include at least one of condition A and condition B. In the embodiment in FIG. 13, operations are based on a determination of condition A and condition B.

Condition A may include one of the following cases (1-5):

1) when search scheme A is indicated through a physical signal, such as an L1 signal;

2) when search scheme A is indicated through a higher layer signal, such as SIB, RRC, MAC, or CE;

3) when the control information including a search scheme is detected and the terminal has been instructed, through the configuration information, to employ search scheme A, or when the control information not including a search scheme is detected and the terminal has been previously instructed, through a higher layer signal, to employ search scheme A (this may be a combination of the methods described above, both control information including a search scheme as configuration information and control information not including a search scheme may be simultaneously transmitted to a terminal);

4) when the terminal is aware of only the transmission of the control information including configuration information and is instructed, through the detected control information including the configuration information, to employ search scheme A, or when the terminal knows transmission of only the control information not including the configuration information and has been previously instructed, through a higher layer signal, to employ search scheme A (this may be a combination of the methods described above, only one type of information among control information including a search scheme as configuration information and control information not including a search scheme may be allowed to be transmitted to a terminal); and 5) mapping scheme A has been determined according to a standard.

Condition B may include one of the following cases (1-5):

1) when search scheme B is indicated through a physical signal, such as an L1 signal;

2) when search scheme B is indicated through a higher layer signal, such as SIB, RRC, MAC, or CE;

3) when the control information including the configuration information is detected and the terminal has been instructed, through the configuration information, to employ search scheme B, or when the control information not including the configuration information is detected and the terminal has been previously instructed, through a higher layer signal, to employ search scheme B (this may be a combination of the methods described above, both control information including a search scheme as configuration information and control information not including a search scheme may be simultaneously transmitted to a terminal);

4) when the terminal is only aware of transmission of the control information including configuration information and is instructed, through the detected control information including the configuration information, to employ search scheme B, or when the terminal is only aware of transmission of the control information not including the configuration information and has been previously instructed, through a higher layer signal, to employ search scheme B (this may be a combination of the methods described above, only one type of information among control information including a search scheme as configuration information and control information not including a search scheme may be allowed to be transmitted to a terminal); and 5) mapping scheme B has been determined in a standard.

The terminal may determine whether, among the conditions, condition A is satisfied or condition B is satisfied in step 1304.

When condition A is satisfied, the terminal may perform control information search operation A in a downlink control area overlapping the scheduled data area (in time or frequency, or both time and frequency) in step 1306.

For example, search operation A may include one of the following operations (1-6):

1) an operation without searching;

2) an operation of searching assuming partial control information;

3) an operation of searching a small number of times, which is assumed to be smaller than the number of times the terminal searches for each CCE aggregation level in a search space in a downlink control area;

4) in a situation where a plurality of control areas (CORESET or search space) (existing in time or frequency, or both time and frequency) have been configured, an operation of searching for a part of the configured control areas (CORESET or search space) may be performed;

5) an operation of searching for only a control area (CORESET or search space) including all terminal common control information or terminal group common control information; and 6) an operation of omitting searching for a control area (CORESET or search space) including terminal-specific control information.

When condition B is satisfied, the terminal may perform control information search operation B in a downlink control area overlapping the scheduled data area (in time or frequency, or both time and frequency) at step 1308.

For example, search operation B may include an operation of performing a conventional control area search operating without change.

Meanwhile, some operations included in operation A may configure operation B, or some operations included in operation B may configure operation A.

Figure 14:
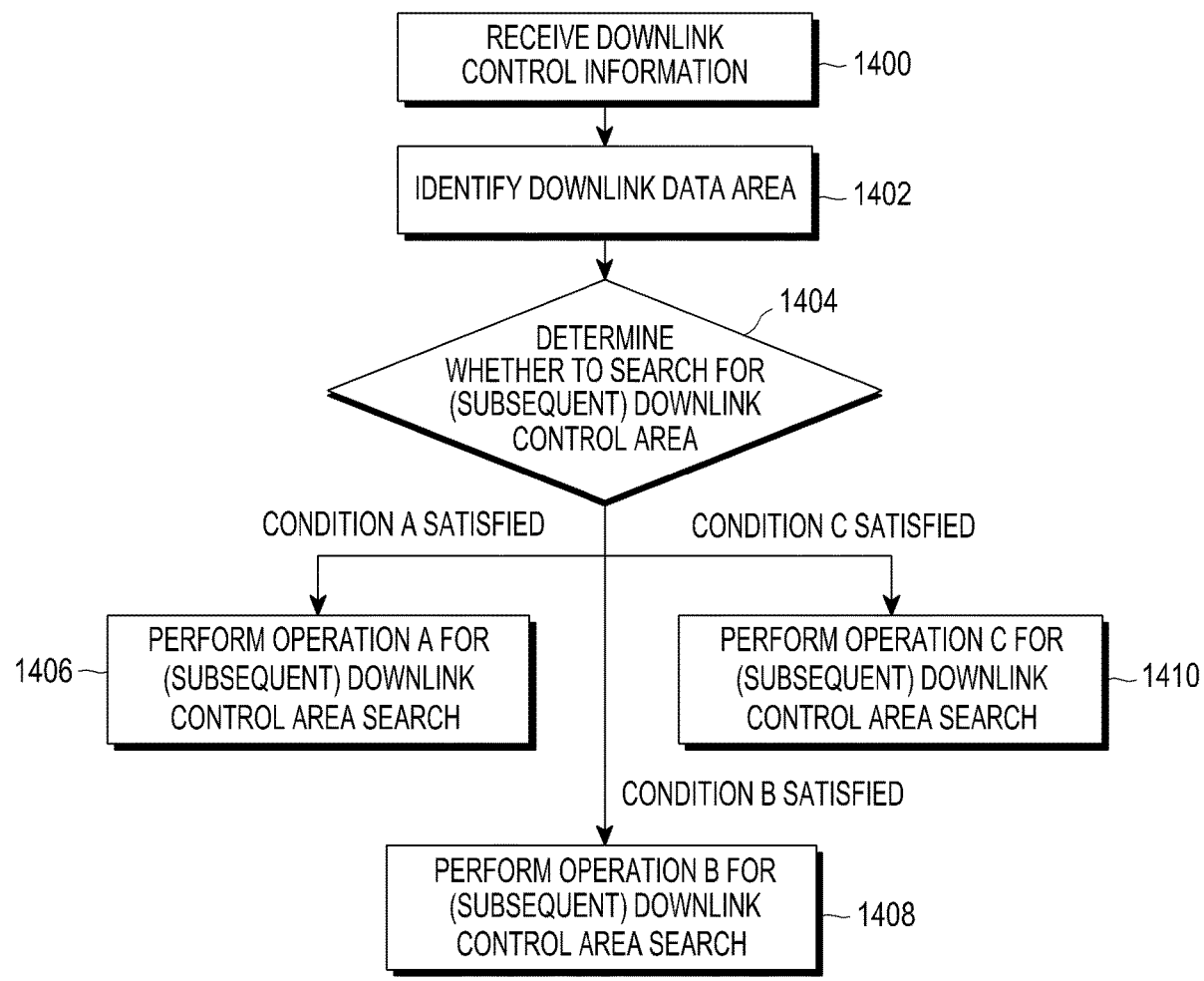
FIG. 14 is a flowchart illustrating a method of searching for a control area by a terminal, according to an embodiment.

FIG. 14 is a flowchart illustrating a method of searching for a control area by a terminal, according to an embodiment.

Referring to FIG. 14, the terminal may receive DCI at step 1400. Further, the terminal may identify a scheduled (uplink or downlink) data area through the received DCI at step 1402.

The terminal may determine a search scheme for a subsequent downlink control area overlapping the scheduled data area (in time or frequency, or both time and frequency) at step 1404. The following conditions (1-5) serving as a basis for the determination in step 1404 may include at least one of condition A, condition B, and condition C. In the embodiment in FIG. 14, operations are based on a determination of at least one of condition A, condition B, and condition C.

For example, condition A may include one of the following cases (1-5):

1) when search scheme A is indicated through a physical signal, such as an L1 signal;

2) when search scheme A is indicated through a higher layer signal, such as SIB, RRC, MAC, or CE;

3) when the control information including a search scheme is detected and the terminal has been instructed, through the configuration information, to employ search scheme A, or when the control information not including a search scheme is detected and the terminal has been previously instructed, through a higher layer signal, to employ search scheme A (this may be a combination of the methods described above, both control information including a search scheme as configuration information and control information not including a search scheme may be simultaneously transmitted to a terminal);

4) when the terminal is only aware of the transmission of the control information including configuration information and is instructed, through the detected control information including the configuration information, to employ search scheme A, or when the terminal is only aware of the transmission of the control information not including the configuration information and has been previously instructed, through a higher layer signal, to employ search scheme A (as a combination of the methods described above, only one type of information among control information including a search scheme as configuration information and control information not including a search scheme may be allowed to be transmitted to a terminal); and 5) search scheme A has been determined according to a standard.

For example, condition B may include one of the following cases (1-5):

1) when search scheme B is indicated through a physical signal, such as an L1 signal;

2) when search scheme B is indicated through a higher layer signal, such as SIB, RRC, MAC, or CE;

3) when the control information including the configuration information is detected and the terminal has been instructed, through the configuration information, to employ search scheme B, or when the control information not including the configuration information is detected and the terminal has been previously instructed, through a higher layer signal, to employ search scheme B (this may be a combination of the methods described above, both control information including a search scheme as configuration information and control information not including a search scheme may be simultaneously transmitted to a terminal);

4) when the terminal is only aware of transmission of the control information including configuration information and is instructed, through the detected control information including the configuration information, to employ search scheme B, or when the terminal is only aware of the transmission of the control information not including the configuration information and has been previously instructed, through a higher layer signal, to employ search scheme B (this may be a combination of the methods described above, only one type of information among control information including a search scheme as configuration information and control information not including a search scheme may be allowed to be transmitted to a terminal); and 5) search scheme B has been determined in a standard.

For example, condition C may include one of the following cases (1-5):

1) when search scheme C is indicated through a physical signal, such as an L1 signal;

2) when search scheme C is indicated through a higher layer signal, such as SIB, RRC, MAC, or CE;

3) when the control information including the configuration information is detected and the terminal has been instructed, through the configuration information, to employ search scheme C, or when the control information not including the configuration information is detected and the terminal has been previously instructed, through a higher layer signal, to employ search scheme C (this may be a combination of the methods described above, both control information including a search scheme as configuration information and control information not including a search scheme may be simultaneously transmitted to a terminal);

4) when the terminal is only aware of transmission of the control information including configuration information and is instructed, through the detected control information including the configuration information, to employ search scheme C, or when the terminal is only aware of the transmission of the control information not including the configuration information and has been previously instructed, through a higher layer signal, to employ search scheme C (this may be a combination of the methods described above, only one type of information among control information including a search scheme as configuration information and control information not including a search scheme may be allowed to be transmitted to a terminal); and 5) search scheme C has been determined according to a standard.

The terminal may determine whether, among the conditions, condition A is satisfied, condition B is satisfied, or condition C is satisfied at step 1404.

When condition A is satisfied, the terminal may perform control information search operation A in a downlink control area overlapping the scheduled data area (in time or frequency, or both time and frequency at step 1406. Control information search operation A may include, for example, an operation of omitting a search.

When condition B is satisfied, the terminal may perform control information search operation B in a downlink control area overlapping the scheduled data area (in time or frequency, or both time and frequency) at step 1408.

Condition information search operation B may include one of the following cases (1-5):

1) an operation of searching assuming partial control information;

2) an operation of searching a small number of times, which is assumed to be smaller than the number of times the terminal searches for each CCE aggregation level in a search space in a downlink control area;

3) in a situation where a plurality of control areas (CORESET or search space) (existing in time or frequency, or both time and frequency) have been configured, an operation of searching for a part of the configured control areas (CORESET or search space);

4) an operation of searching for only a control area (CORESET or search space) including all terminal common control information or terminal group common control information; and 5) an operation of omitting searching for a control area (CORESET or search space) including terminal-specific control information.

When condition C is satisfied, the terminal may perform control information search operation C in a downlink control area overlapping the scheduled data area (in time or frequency, or both time and frequency at 1410. For example, search information search operation C may include an operation of searching for all (that is, performing the conventional control area search operating without change).

Some operations included in operation A may configure operation B or operation C, some operations included in operation B may configure operation A or operation C, and some operations included in operation C may configure operation A or operation B.

Figure 15:
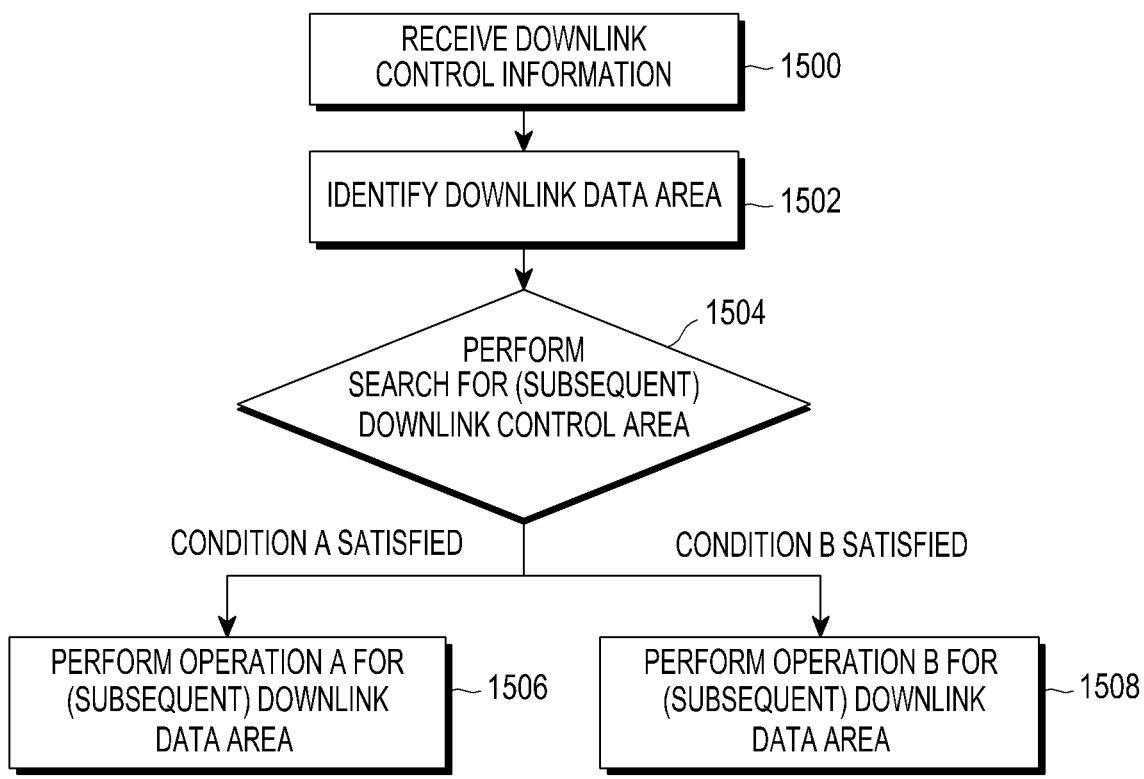
FIG. 15 is a flowchart illustrating a method of receiving a data area by a terminal, according to an embodiment.

FIG. 15 is a flowchart illustrating a process of receiving a data area by a terminal, according to an embodiment.

Referring to FIG. 15, the terminal may receive DCI at step 1500. Further, the terminal may receive scheduling of a data area through the received DCI at step 1502.

When the scheduled downlink data area overlaps a downlink control area, the terminal may first search for a downlink control area at step 1504. Further, the terminal may determine condition A and/or condition B. Condition A may include, for example, a case where DCI is detected. Condition B may include, for example, a case where DCI is not detected.

According to the conditions described above, the terminal may perform an operation for the downlink data area.

When condition A is satisfied, the terminal may perform operation A for the downlink data area at step 1506. For example, operation A may include one of the following operations (1-2):

1) an operation of receiving downlink data information by a terminal assuming that a downlink control area overlapping a downlink data area does not include downlink data information and downlink data information excluding the overlapping area is mapped (i.e., rate matching) to a physical channel area; and 2) an operation of receiving downlink data information by a terminal assuming that a downlink control area overlapping a downlink data area actually does not include downlink data information but downlink data information including the overlapping area is mapped (i.e., rate matching) to a physical channel area.

When condition B is satisfied, the terminal may perform operation B for the downlink data area at step 1510. For example, operation B may include an operation of receiving downlink data information by a terminal assuming that a downlink control area overlapping a downlink data area includes downlink data information and downlink data information including the overlapping area is mapped (i.e., rate matching) to a downlink physical channel area (including a downlink control area overlapping the area).

Figure 16:
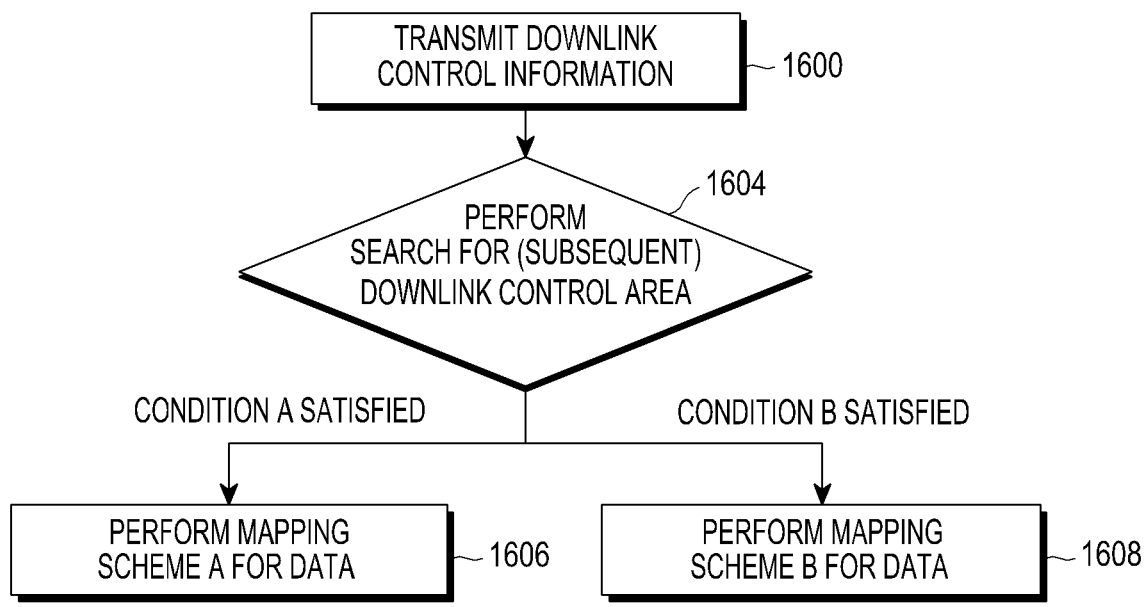
FIG. 16 is a flowchart illustrating a process of receiving or transmitting a data area by a base station, according to an embodiment.

FIG. 16 is a flowchart illustrating a process of receiving or transmitting a data area by a BS, according to an embodiment.

Referring to FIG. 16, the BS may transmit DCI to the terminal at 1600. The BS may perform scheduling in an uplink or downlink data area. The BS may identify a mapping scheme condition for the scheduled data area at step 1604.

The mapping scheme condition may include condition A and/or condition B. Condition A may include, for example, a case where the scheduled data area overlaps a subsequent downlink control area for which the terminal searches. Condition B may include, for example, a case where the scheduled data area does not overlap a subsequent downlink control area for which the terminal searches.

The BS may determine whether condition A is satisfied or condition B is satisfied.

When condition A is satisfied, operation A in which data information relating to downlink data transmission or uplink data reception is mapped to a corresponding data physical channel may be assumed, or application of operation A may be notified through a higher layer signal, a physical signal, or a combination thereof, or according to a method defined according to a standard.

When condition A is satisfied, the BS may perform operation A at step 1606. Operation A may include, for example, at least one of (1-3):

1) an operation of mapping the data information to a data physical channel in all subsequent downlink control areas, which overlap the scheduled data area and are searched for by the terminal;

2) an operation of mapping the data information to a data physical channel in remaining areas after excluding the subsequent downlink control areas, which overlap the scheduled data area and are searched for by the terminal; and 3) an operation of mapping the data information to a data physical channel in remaining areas after partly excluding the subsequent downlink control areas, which overlap the scheduled data area and are searched for by the terminal.

When condition B is satisfied, the BS may perform operation B without a channel for transferring particular information at step 1610. Operation B may include, for example, an operation of mapping the data information to the scheduled data physical channel area.

Some operations included in operation A may configure operation B, or some operations included in operation B may configure operation A.

A subsequent downlink control area described in the present disclosure refers to a control area occurring temporally later than a downlink control area indicating data area scheduling. Further, an overlapping area between a data area and a control area discussed in the present disclosure may be applied regardless of time or frequency.

The overlapping area discussed in the present disclosure may be an overlapping area between a scheduled data physical channel resource and a control physical channel resource configured to allow control information allocated to the terminal within a control area to be actually transferred to the terminal (i.e., a downlink control physical channel resource, through which DCI is actually transmitted, and a candidate resource thereof).

The overlapping area discussed in the present disclosure may be an overlapping area between a scheduled data physical channel resource (configured by time and frequency) and a physical channel resource (configured by time and frequency) configured as a control area.

When an area overlapping in view of both time and frequency is determined as an overlapping area discussed in the present disclosure, an area overlapping in view of only one of time and frequency may not be determined as the overlapping area.

Figure 17:
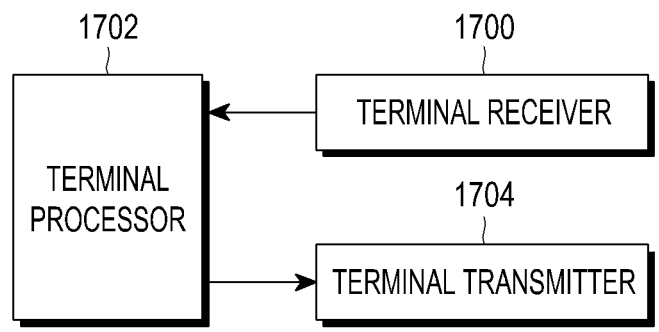
FIG. 17 is a block diagram illustrating a structure of a terminal, according to an embodiment.

FIG. 17 is a block diagram illustrating a structure of a terminal, according to an embodiment.

Referring to FIG. 17, the terminal may include a terminal receiver 1700, a terminal transmitter 1704, and a terminal processor 1702. The terminal receiver 1700 and the terminal transmitter 1704 may be collectively referred to as a transceiver. The transceiver may transmit or receive a signal to or from a BS. The signal may include DCI and data. To this end, the transceiver may include a radio frequency (RF) transmitter for up-converting and amplifying a frequency of a transmitted signal and an RF receiver for low noise-amplifying a received signal and down-converting a frequency. Further, the transceiver may receive a signal through a wireless channel to output the received signal to the terminal processor 1702, and may transmit a signal output from the terminal processor 1702 through a wireless channel. The terminal processor 1702 may control a series of processes to enable the terminal to operate according to each of the embodiments illustrated in FIGS. 3 to 16, or at least one of the embodiments.

For example, the terminal receiver 1700 may receive a signal including second transmission timing information from the BS and the terminal processor 1702 may analyze the second transmission timing information. Thereafter, the terminal transmitter 1704 may transmit a second signal at the timing.

Figure 18:
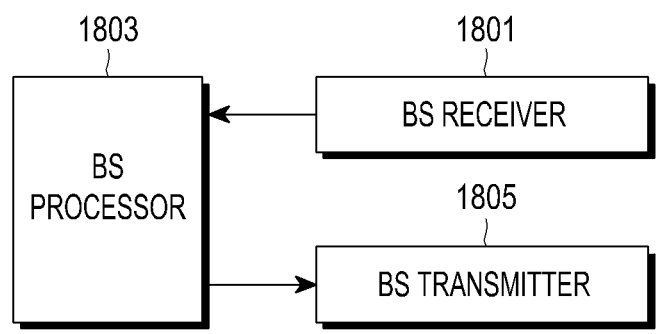
FIG. 18 is a block diagram illustrating a structure of a base station, according to an embodiment.

FIG. 18 is a block diagram illustrating a structure of a BS, according to an embodiment.

Referring to FIG. 18, the BS may include at least one of a BS receiver 1801, a BS transmitter 1805, and a BS processor 1803. The BS receiver 1801 and the BS transmitter 1805 may collectively be referred to as a transceiver. The transceiver may transmit or receive a signal to or from a terminal. The signal may include DCI and data. To this end, the transceiver may include an RF transmitter for up-converting and amplifying a frequency of a transmitted signal and an RF receiver for low noise-amplifying a received signal and down-converting a frequency. Further, the transceiver may receive a signal through a wireless channel to output the received signal to the BS processor 1803, and may transmit a signal output from the BS processor 1803 through a wireless channel. The BS processor 1803 may control a series of processes to enable the BS to operate according to each of the embodiments illustrated in FIGS. 3 to 16 or at least one of the embodiments.

For example, the BS processor 1803 may determine a second signal transmission timing and generate information of the second signal transmission timing to be transmitted to the terminal. Thereafter, the BS transmitter 1805 may transfer the timing information to the terminal, and the BS receiver 1801 may receive a second signal at the timing. Further, according to an embodiment of the present disclosure, the BS processor 1803 may generate DCI including the second signal transmission timing information. The DCI may indicate the second signal transmission timing information.

The exemplary embodiments disclosed in the specification and associated drawings are merely presented to easily describe technical contents of the present disclosure and to help the understanding of the present disclosure and are not intended to limit the scope of the present disclosure. Further, if necessary, the above respective embodiments may be employed in combination. For example, the embodiments 1, 2, and 3 may be partially combined so as to operate a BS and a terminal. Further, although the above embodiments have been described on the basis of the NR system, it may be possible to implement other variant embodiments on the basis of the technical idea of the embodiments in other systems such as FDD or TDD LTE systems.

The above-described operations may be implemented by including a memory device storing the corresponding program code in a server of a communication system or a predetermined configuration unit within a terminal device. That is, the processor of a BS or terminal device may perform the above described operations by reading and executing the program code stored in the memory device by means of a processor or a CPU.

The various components of the server or terminal device described in the present specification may operate by using a hardware circuit, for example, a combination of a complementary metal oxide semiconductor based logical circuit, firmware, software and/or hardware, and a combination of firmware and/or software inserted into a machine-readable medium. Various electric configurations and methods may be carried out by using electric circuits such as transistors, logic gates, and an application specific integrated circuit (ASIC).

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for receiving a physical downlink shared channel (PDSCH) by a user equipment (UE), the method comprising:
  receiving, from a base station, configuration information indicating at least one resource set that is not available for the PDSCH, the at least one resource set included in a bandwidth part;
  receiving, from the base station, downlink control information on a downlink control resource area included in the at least one resource set;
  in case that a downlink data area scheduled by the downlink control information overlaps a downlink control area among the at least one resource set indicated by the configuration information, identifying a downlink resource area by excluding the downlink control area; and
  receiving, from the base station, the PDSCH on the identified downlink resource area.

2. The method of claim 1, wherein the at least one resource set is indicated dynamically by the configuration information as a higher layer signaling and a physical layer signal.

3. The method of claim 1, wherein the configuration information comprises information indicating a frequency domain resource in units of a resource block (RB) of the at least one resource set and information indicating a time domain resource in units of an orthogonal frequency division multiplexing (OFDM) symbol associated with the at least one resource set.

4. A method for transmitting a physical downlink shared channel (PDSCH) by a base station, the method comprising:
  transmitting, to a user equipment (UE), configuration information indicating at least one resource set that is not available for the PDSCH, the at least one resource set included in a bandwidth part;
  transmitting, to the UE, downlink control information on a downlink control resource area included in the at least one resource set;
  in case that a downlink data area scheduled by the downlink control information overlaps a downlink control area among the at least one resource set indicated by the configuration information, identifying a downlink resource area by excluding the downlink control area; and
  transmitting, to the UE, the PDSCH on the identified downlink resource area.

5. The method of claim 4, wherein the at least one resource set is indicated dynamically by the configuration information as a higher layer signaling and a physical layer signal.

6. The method of claim 4, wherein the configuration information comprises information indicating a frequency domain resource in units of a resource block (RB) of the at least one resource set and information indicating a time domain resource in units of an orthogonal frequency division multiplexing (OFDM) symbol associated with the at least one resource set.

7. A user equipment (UE) for receiving a physical downlink shared channel (PDSCH), the UE comprising:
 a transceiver; and
 a processor configured to control the transceiver to:
  receive, from a base station, configuration information indicating at least one resource set that is not available for the PDSCH, the at least one resource set included in a bandwidth part;
  receive, from the base station, downlink control information on a downlink control resource area included in the at least one resource set;
  in case that a downlink data area scheduled by the downlink control information overlaps a downlink control area among the at least one resource set indicated by the configuration information, identifying a downlink resource area by excluding the downlink control area; and
  receive, from the base station, the PDSCH on the identified downlink resource area.

8. The UE of claim 7, wherein the at least one resource set is indicated dynamically by the configuration information as a higher layer signaling and a physical layer signal.

9. The UE of claim 7, wherein the configuration information comprises information indicating a frequency domain resource in units of a resource block (RB) of the at least one resource set and information indicating a time domain resource in units of an orthogonal frequency division multiplexing (OFDM) symbol associated with the at least one resource set.

10. A base station for transmitting a physical downlink shared channel (PDSCH), the base station comprising:
 a transceiver; and
 a processor configured to control the transceiver to:
  transmit, to a user equipment (UE), configuration information indicating at least one resource set that is not available for the PDSCH, the at least one resource set included in a bandwidth part,
  transmit, to the UE, downlink control information on a downlink control resource area included in the at least one resource set,
  in case that a downlink data area scheduled by the downlink control information overlaps a downlink control area among the at least one resource set indicated by the configuration information, identifying a downlink resource area by excluding the downlink control area, and
  transmit, to the UE, the PDSCH on the identified downlink resource area.

11. The base station of claim 10, wherein the at least one resource set is indicated dynamically by the configuration information as a higher layer signaling and a physical layer signal.

12. The base station of claim 10, wherein the configuration information comprises information indicating a frequency domain resource in units of a resource block (RB) of the at least one resource set and information indicating a time domain resource in units of an orthogonal frequency division multiplexing (OFDM) symbol associated with the at least one resource set.

13. The method of claim 1, wherein different types of control channel element, CCE, aggregation levels are configured for each of the at least one resource set and different number of times of blind decoding is applied for each CCE aggregation level.

14. The method of claim 1, wherein each of the at least one resource set is aperiodically configured for the UE, and each of the at least one resource set includes different number of symbols.

15. The method of claim 4, wherein different types of control channel element, CCE, aggregation levels are configured for each of the at least one resource set and different number of times of blind decoding is applied for each CCE aggregation level.

16. The method of claim 4, wherein each of the at least one resource set is aperiodically configured for the UE, and each of the at least one resource set includes different number of symbols.

17. The UE of claim 7, wherein different types of control channel element, CCE, aggregation levels are configured for each of the at least one resource set and different number of times of blind decoding is applied for each CCE aggregation level.

18. The UE of claim 7, wherein each of the at least one resource set is aperiodically configured for the UE, and each of the at least one resource set includes different number of symbols.

19. The base station of claim 10, wherein different types of control channel element, CCE, aggregation levels are configured for each of the at least one resource set and different number of times of blind decoding is applied for each CCE aggregation level.

20. The base station of claim 10, wherein each of the at least one resource set is aperiodically configured for the UE, and each of the at least one resource set includes a different number of symbols.

* * * * *